(12) United States Patent
Hatta et al.

(10) Patent No.: US 8,092,937 B2
(45) Date of Patent: Jan. 10, 2012

(54) BATTERY PACK

(75) Inventors: Kazuhito Hatta, Fukushima (JP); Masato Sato, Fukushima (JP); Hiroyuki Yamada, Fukushima (JP); Takehiko Suwa, Fukushima (JP); Toshio Koishikawa, Fukushima (JP)

(73) Assignee: Sony Corporation, Tokyo (JP)

( * ) Notice: Subject to any disclaimer, the term of this patent is extended or adjusted under 35 U.S.C. 154(b) by 574 days.

(21) Appl. No.: 12/100,952

(22) Filed: Apr. 10, 2008

(65) Prior Publication Data

US 2008/0254348 A1    Oct. 16, 2008

(30) Foreign Application Priority Data

Apr. 12, 2007    (JP) ................. 2007-104607

(51) Int. Cl.
*H01M 2/02*    (2006.01)
*H01M 2/10*    (2006.01)
(52) U.S. Cl. .............. 429/177; 429/176; 429/185
(58) Field of Classification Search .............. 429/177
See application file for complete search history.

(56) References Cited

U.S. PATENT DOCUMENTS

2007/0111091 A1* 5/2007 Hiratsuka et al. .......... 429/176
2007/0128513 A1* 6/2007 Hatta et al. ................. 429/176

FOREIGN PATENT DOCUMENTS

| EP | 1 315 219 | 5/2003 |
|---|---|---|
| EP | 1 406 321 | 4/2004 |
| EP | 1 473 785 | 11/2004 |

OTHER PUBLICATIONS

Ultarathin Lithium-ion Battery Using Aluminum Laminated Film Case, (2001).

* cited by examiner

*Primary Examiner* — John S Maples
(74) *Attorney, Agent, or Firm* — K&L Gates LLP

(57) ABSTRACT

A battery pack includes a non-aqueous electrolyte secondary battery, a rigid covering member, and a protection circuit board. The secondary battery includes a battery element and a flexible covering member formed of a first laminated film composed of a first heat-bonding layer, a first metal layer, and a first outer covering layer laminated successively. The flexible covering member is sealed along around the battery element while leaving electrode terminals of the positive and negative electrodes extended outside the battery element. The rigid covering member is formed of a second laminated film composed of a second heat-bonding layer, a second metal layer, and a second outer covering layer laminated successively. The flexible covering member and the rigid covering member are bonded with an adhesive strength equal to or higher than atmospheric pressure and with a peel strength equal to or lower than a breaking strength of the flexible covering member.

14 Claims, 19 Drawing Sheets

BATTERY PACK

CROSS-REFERENCE TO RELATED APPLICATIONS

The present application claims priority to Japanese patent Application No. 2007-104607 filed in the Japanese Patent Office on Apr. 12, 2007, the entire disclosure of which is incorporated herein by reference.

BACKGROUND

The present application relates to a battery pack, more particularly, to a battery pack applied to a non-aqueous electrolyte secondary battery, such as a lithium-ion secondary battery.

In recent years, various types of portable electronic devices, such as videotape recorders (VTRs) with camera, cell phones, and laptop computers, are widely used, and those having smaller size and weight are being developed. As the portable electronic devices are miniaturized, demand for battery as a power source of them is rapidly increasing. To reduce the size and weight of the device, the battery design in which the battery is lightweight and thin, and the housing space for the device can be efficiently used, is desired as well. It is known that, as a battery for meeting the demands, a lithium-ion secondary battery having a large energy density and a large power density is the most preferred.

In the development of the lithium-ion secondary battery, putting into practical use batteries having high selectivity of shape, sheet-type batteries having a reduced thickness and a large area, or card-type batteries having a reduced thickness and a small area is desired.

For meeting the demands, it has been recently reported that the thin battery as described above can be obtained using a casing member in a film form, such as an aluminum laminated film (see, for example, TAKAMI Norio, "Ultrathin lithium-ion battery using aluminum laminated film case", Toshiba Review, Toshiba Corporation, Vol. 56, No. 2, February, 2001, pp. 10-13 (hereinafter referred to as "non-patent document 1")).

FIGS. 1A-1C show the external views of a battery 1 disclosed in the non-patent document 1. FIGS. 1A, 1B, and 1C are a plan view, a front view, and a section view of the thin lithium-ion battery for cellular phones, respectively.

The thin battery 1 is produced by covering a flat-type battery element, which is formed of stacking a positive electrode and a negative electrode through a separator and spirally winding them, with an aluminum laminated film and sealing the film around the battery element.

A positive electrode terminal 2a and a negative electrode terminal 2b respectively connected to the positive electrode and negative electrode are extended outside the battery, for example, from one side of the thin battery 1, and the aluminum laminated film around the battery element except for one side is sealed and then an electrolyte solution is injected from the unsealed opening, and finally the side of the film from which the positive electrode terminal 2a and negative electrode terminal 2b are extended is sealed, thus obtaining the thin battery.

This thin battery uses a casing of an aluminum laminated film having a thickness of about 100 μm, and hence has small strength, as compared to a battery using a metallic can, and it is difficult to use this battery as a battery pack as it is. Accordingly, a battery pack containing a battery element covered with a laminated film in a pack housing formed of a plastic and firmly fixed with an adhesive double-faced tape or the like is widely used. Further, it has been known that the battery pack can be improved in resistance to drop impact or shock by increasing the thickness of the housing.

However, in such a known thin battery, the housing is bonded with the surface of the battery at limited bonding portions, and hence, when the battery is dropped from a certain height or higher, there is a possibility that, although the battery element is not damaged, a load is concentrated on the flexible battery casing to break the casing or a pinhole is formed in the metal layer of the casing, and then moisture enters the inside of the battery by passing through the resin layer.

In this case, even in the battery pack which seems to suffer no deformation or the like from the external view of the pack and which can be fitted into an electric device, when the casing for battery is broken, moisture in air reacts with the electrode or electrolyte to continuously generate harmful gas, or when only pinhole is formed, the moisture vigorously reacts with the electrode or electrolyte to generate gas during the charging, so that the battery pack unusually expands, whereby causing a possibility of breaking the portable electric device.

Further, the pack housing inevitably has a thickness as large as about 300 μm or more due to the limitation of the technique for thin plastic molding or for securing the strength of housing, and therefore it is difficult to increase the battery volume to be contained in the housing.

SUMMARY

Accordingly, it is desirable to provide a battery pack in which the load concentration on the flexible covering member is reduced and hence the battery pack is improved in reliability or safety after suffering drop and has such strength that the battery pack can resist deformation or the like when it suffers an impact/shock of short drop. Furthermore, if the battery pack suffers an impact/shock such that the flexible covering member is damaged, the external view of the resultant battery pack advantageously reveals that the battery pack cannot be subsequently fitted into an electric device or charged, the battery pack has such excellent volume efficiency that the volume of the battery element to be contained can be as large as possible.

The present inventors have conducted studies with a view toward achieving the above issue. As a result, it has been found that, by appropriately controlling the state of bonding between the flexible covering member and the rigid covering member so that the adhesive strength and peel strength are in the respective predetermined ranges, the issue can be achieved.

In accordance with an embodiment, there is provided a battery pack which includes a non-aqueous electrolyte secondary battery, a rigid covering member, a protection circuit board. The non-aqueous electrolyte secondary battery includes (a) a battery element including a positive electrode, a negative electrode, and a separator which are spirally wound or stacked, the separator being disposed between the positive electrode and the negative electrode, the battery element including a non-aqueous electrolyte composition, (b) a flexible covering member, formed of a first laminated film, which covers the battery element. The first laminated film is composed of a first heat-bonding layer, a first metal layer, and a first outer covering layer which are laminated successively. The flexible covering member is sealed along around the battery element while leaving electrode terminals of the positive and negative electrodes extended outside the battery element. The rigid covering member covers the non-aqueous electrolyte secondary battery together with the flexible covering member, and is formed of a second laminated film composed of a second-heat-bonding layer, a second metal layer, and a second outer covering layer which are laminated successively. The protection circuit board, housed in the rigid covering member, controls a voltage and a current of the non-aqueous electrolyte secondary battery. The battery element and the flexible covering member adhere to each other. The flexible covering member and the rigid covering member are bonded with an adhere strength equal to or higher than atmospheric pressure and with a peel strength equal to or lower than a breaking strength of the flexible covering member.

In accordance with another embodiment, there is provided a battery pack which includes a non-aqueous electrolyte secondary battery and a protection circuit board. The non-aqueous electrolyte secondary battery includes (a) a battery element including a positive electrode, a negative electrode, and a separator which are spirally wound or stacked, the separator being disposed between the positive electrode and the negative electrode, the battery element including a non-aqueous electrolyte composition, (b) a flexible covering member, formed of a first laminated film, which covers a principal portion of the battery element, the first laminated film being composed of a first heat-bonding layer, a first metal layer, and a first outer covering layer which are laminated successively, (c) a rigid covering member, formed of a second laminated film, which covers a remaining portion of the battery element and the flexible covering member, the second laminated film being composed of a second heat-bonding layer, a second metal layer, and a second outer covering layer which are laminated successively. The flexible covering member and the rigid covering member are bonded along around the battery element to seal the battery element while leaving electrode terminals of the positive and negative electrodes extended outside the battery element. The protection circuit board, housed in the rigid covering member, controls a voltage and a current of the non-aqueous electrolyte secondary battery. The battery element and the flexible covering member adhere to each other. The flexible covering member and the rigid covering member other than around the battery element are bonded with an adhesive strength equal to or higher than atmospheric pressure and with a peel strength equal to or higher than a breaking strength of the flexible covering member.

Additional features and advantages are described herein, and will be apparent from the following Detailed Description and the figures.

DETAILED DESCRIPTION

The battery pack an embodiment will be described in detail below with reference to the accompanying drawings. In the present specification, with respect to the concentration, content, amount, and others, "%" is given by weight unless otherwise specified.

First Embodiment

In the present embodiment, a casing member in which a rigid laminated film having a four-layer structure is used is described.

Figure 1:
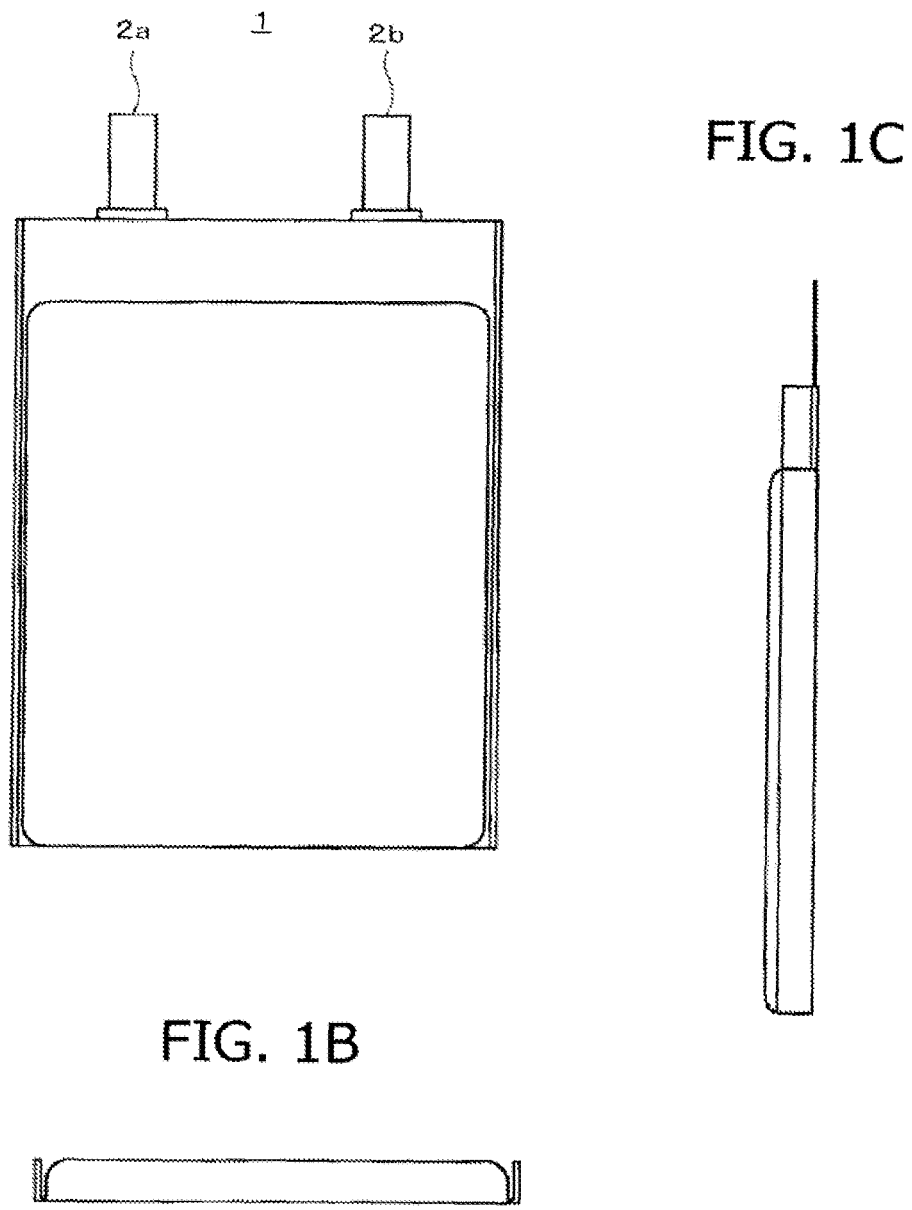
FIGS. 1A to 1C are diagrammatic views showing the structure of the battery described in the non-patent document 1.
Figure 2:
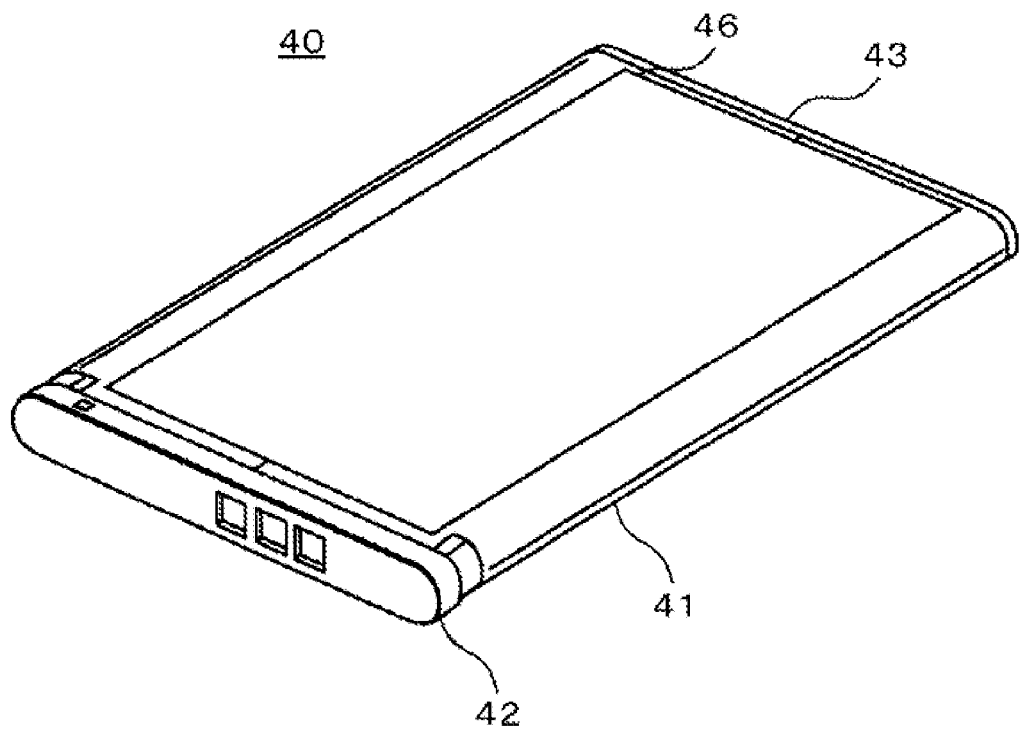
FIG. 2 is a perspective view of a battery pack according to a first embodiment.

FIG. 2 shows the external view of a battery pack for lithium-ion polymer secondary battery, which is a battery pack according to one embodiment. The battery pack 40 has a lithium-ion polymer battery, which is an example of a non-aqueous electrolyte secondary battery, contained in a rigid laminated film 41 as a rigid covering member, and a top cover 42 and a rear cover 43 which are resin molded covers fitted to openings at the both ends of the battery pack, and optionally has a product label 46.

In the first embodiment and the second embodiment described later, "battery" refers to a battery element covered with a flexible laminated film which is a flexible covering member, "battery assembly" refers to a battery covered with the rigid laminated film 41, and "battery pack" refers to one having the structure shown in FIG. 2, obtained by connecting a circuit board to the battery assembly and fitting thereto the top cover 42 and rear cover 43.

Figure 3A:
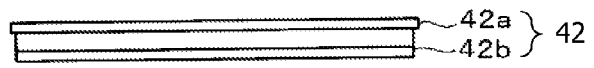
FIGS. 3A to 3C are top views showing the structure of a battery pack according to the first embodiment.
Figure 3B:
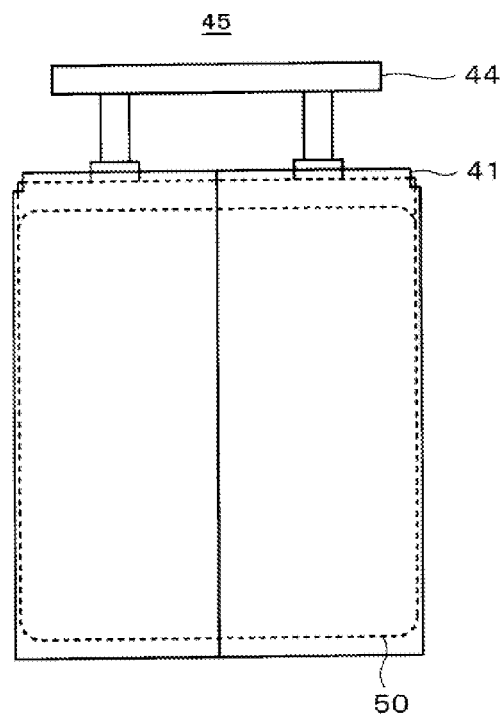
Figure 3C:
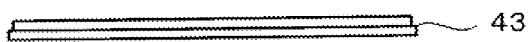

FIGS. 3A to 3C show the structure of the battery pack 40. The battery pack 40 includes a battery 50 including a battery element covered with a flexible laminated film, a circuit board 44, a top cover 42, and a rear cover 43, wherein the batter 50 is covered with a rigid laminated film 41.

The top cover 42 is a resin molded cover which is provided at a top portion from which a positive electrode and a negative electrode are extended, and which is fitted to the opening of the battery assembly. The rear cover 43 is a resin molded cover which is provided at a bottom portion of the battery and fitted to the opening of the battery assembly 45.

The top cover 42 and rear cover 43 are fitted to the respective openings of the battery assembly 45 and then bonded with the battery assembly 45 by heat sealing or the like. The top cover 42 is formed of an upper holder 42a and a lower holder 42b fitted to each other, and the circuit board 44 is disposed between the upper holder 42a and the lower holder 42b.

The circuit board 44 has a protection circuit mounted in advance thereon, and the protection circuit is connected by resistance welding, ultrasonic welding, or the like to the positive electrode terminal and negative electrode terminal extended from the battery 50. The protection circuit has a temperature protection element such as a positive temperature coefficient (PTC) element or a thermistor so as to cut off the current circuit in the battery if the battery becomes high-temperature.

The battery pack 40 includes a terminal for connection with an electric device (not shown). The top cover 42 is provided with a terminal window through which the terminal for connection with the electric device is exposed.

Next, the battery element is described.

Figure 4:
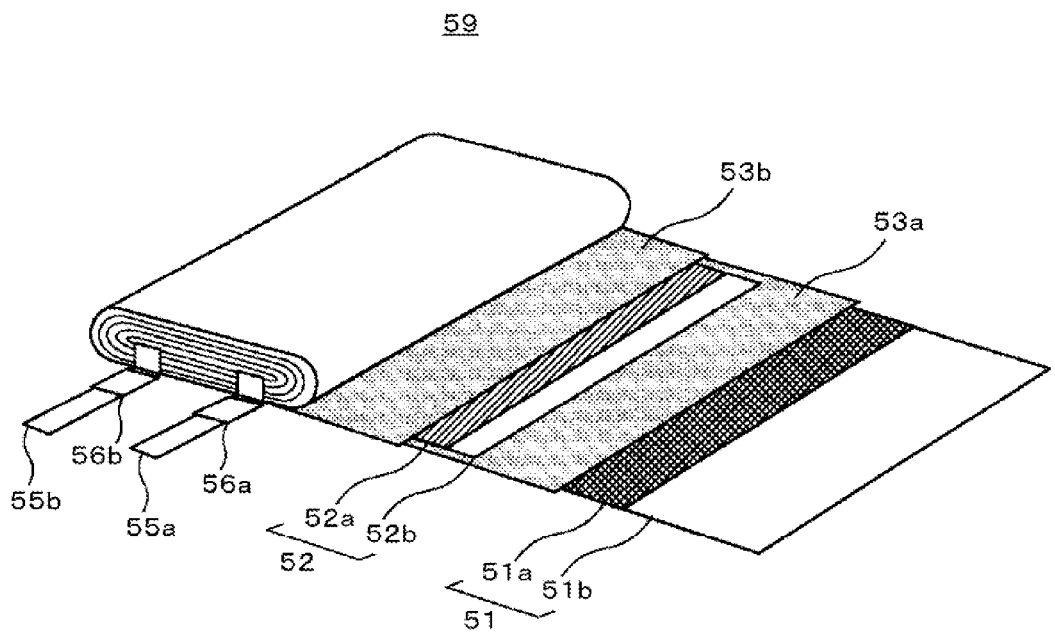
FIG. 4 is a perspective view showing the structure of a battery element in a battery pack according to the first embodiment.

FIG. 4 shows the structure of a battery element 59 used in the battery assembly 45.

The battery element 59 includes a strip positive electrode 51, a separator 53a, a strip negative electrode 52 disposed opposite the positive electrode 51, and a separator 53b, which are stacked successively and spirally wound together in the longitudinal direction, and a gel electrolyte (not shown) is applied to both sides of the positive electrode 51 and negative electrode 52.

A positive electrode terminal 55a connected to the positive electrode 51 and a negative electrode terminal 55b connected to the negative electrode 52 are extended from the battery element 59, and both sides of each of the positive electrode terminal 55a and the negative electrode terminal 55b are covered with resin pieces 56a and 56b, respectively, to improve the bonding properties with the laminated film for covering. When an electrolyte solution is used, an electrolyte solution injection step is subsequently provided.

Materials constituting the battery element 59 are described below in detail.

Positive Electrode

The positive electrode 51 includes a cathode active material layer 51a including a cathode active material and being formed on both sides of a cathode current collector 51b. The cathode current collector 51b is composed of a metallic foil, such as an aluminum (Al) foil.

The cathode active material layer 51a includes, for example, a cathode active material, a conductor, and a binder. These components are intimately mixed with one another to prepare a positive electrode composition, and the positive electrode composition is dispersed in a solvent to form a slurry. Then, the slurry is uniformly applied to the cathode current collector 51b by a doctor blade method or the like, and dried at a high temperature so that the solvent is volatized to form a cathode active material layer.

With respect to the amounts of the cathode active material, conductor, binder, and solvent, there is no particular limitation as long as they are uniformly dispersed.

As the cathode active material, a composite oxide of lithium and a transition metal, representatively, $LiXMO_2$ wherein M represents at least one transition metal, and x varies depending on the charged or discharged state of the battery, and is generally 0.05 to 1.10 is used. As a transition metal constituting the lithium composite oxide, cobalt (Co), Ni, manganese (Mn), or the like is used.

Specific examples of the lithium composite oxides include $LiCoO_2$, $LiNiO_2$, $LiMn_2O_4$, and $LiNi_yCo_{1-y}O_2$ (0<y<1).

A solid solution obtained by replacing part of the transition metal element in the lithium composite oxide by another element may be used. Examples of the solid solutions include $LiNi_{0.5}Co_{0.5}O_2$ and $LiNi_{0.8}Co_{0.2}O_2$. These lithium composite oxides can generate high voltage and have excellent energy density. Alternatively, as the cathode active material, a metal sulfide or oxide containing no lithium, such as $TiS_2$, $MoS_2$, $NbSe_2$, or $V_2O_5$, may be used.

As a conductor, a carbon material, such as carbon black or graphite, is used. As a binder, for example, polyvinylinde di-fluoride, or polytetrafluoroethylene is used. As a solvent, for example, N-methylpyrrolidone is used.

The positive electrode 51 has a positive electrode terminal 55a connected to one end of the current collector by spot welding or ultrasonic welding. The positive electrode terminal 55a is desirably composed of a metallic foil or mesh, but the terminal may be composed of a material other than a metal as long as the material is electrochemically and chemically stable and can achieve electrical conduction.

An example of a material for the positive electrode terminal 55a is Al.

Negative Electrode

The negative electrode 52 includes an anode active material layer 52a including an anode active material and being formed on both sides of an anode current collector 52b. The anode current collector 52b is composed of a metallic foil, such as a copper (Cu) foil, a Ni foil, or a stainless steel foil.

The anode active material layer 52a includes, for example, an anode active material, and optionally a conductor and a binder. These components are intimately mixed with one another to prepare a negative electrode composition, and the negative electrode composition is dispersed in a solvent to form a slurry. Then, the slurry is uniformly applied to the anode current collector 52b by a doctor blade method or the like, and dried at a high temperature so that the solvent is vaporized to form an anode active material layer 52a. With respect to the amounts of the anode active material, conductor, binder, and solvent, there is no particular limitation as long as they are uniformly dispersed.

As the anode active material, lithium metal, a lithium alloy, a carbon material capable of being doped with lithium and dedoped, or a composite material of a metal material and a carbon material is used.

Specific examples of carbon materials capable of being doped with lithium and dedoped include graphite, hardly graphitizable carbon, and easily graphitizable carbon. More specifically, a carbon material, such as pyrolytic carbon, coke (pitch coke, needle coke, or petroleum coke), graphite, glassy carbon, a calcined product of an organic polymer compound (obtained by carbonizing a phenolic resin, a furan resin, or the like by calcination at an appropriate temperature), carbon fiber, or activated carbon, can be used. Further, as a material capable of being doped with lithium and dedoped, a polymer, such as polyacetylene or polypyrrole, or an oxide, such as $SnO_2$, may be used.

As a material capable of being alloyed with lithium, various types of metals may be used, but tin (Sn), cobalt (Co), indium (In), Al, silicon (Si), or an alloy thereof is generally used. When using metallic lithium, it is not always necessary to mix lithium powder with a binder to form a coating film, and a rolled Li metallic sheet may be used.

As a binder, for example, polyvinylidene fluoride or a styrene-butadiene rubber is used. As a solvent, for example, N-methylpyrrolidone or methyl ethyl ketone is used.

Like the positive electrode 51, the negative electrode 52 has a negative electrode terminal 55b connected to one end of the anode current collector 52b by spot welding or ultrasonic welding. The negative electrode terminal 52b is desirably composed of a metallic foil or mesh, but the terminal may be composed of a material other than a metal as long as the material is electrochemically and chemically stable and can achieve electrical conduction. An example of materials for the negative electrode terminal 52b is copper and Ni.

It is preferred that the positive electrode terminal 55a and the negative electrode terminal 55b are extended from the same side, but they may be extended from any sides as long as short-circuiting or the like does not occur and there is no adverse effect on the battery performance. With respect to the connecting portion between the positive electrode terminal 55a and negative electrode terminal 55b, the connecting position and the method for connecting are not limited to the examples described above as long as electrical contact can be made.

Electrolyte

In the electrolyte, i.e., non-aqueous electrolyte composition, an electrolyte salt and a non-aqueous solvent generally used in lithium-ion battery may be used.

Specific examples of non-aqueous solvents include ethylene carbonate (EC), propylene carbonate (PC), γ-butyrolactone, dimethyl carbonate, diethyl carbonate, ethylmethyl carbonate, dipropyl carbonate, ethylpropyl carbonate, and solvents obtained by replacing the hydrogen in the above carbonates by a halogen.

These solvents may be used individually or in combination.

As the electrolyte salt, one which is soluble in the above non-aqueous solvent is used, and it includes a combination of a cation and an anion. As a cation, an alkali metal or alkaline earth metal is used. As an anion, $Cl^-$, $Br^-$, $I^-$, $SCN^-$, $ClO_4^-$, $BF_4^-$, $PF_6^-$, $CF_3SO_3^-$, or the like is used.

Specific examples of electrolyte salts include $LiPF_6$, $LiBF_4$, $LiN(CF_3SO_2)_2$, $LiN(C_2F_5SO_2)_2$, and $LiClO_4$. With respect to the electrolyte salt concentration, there is no particular limitation as long as the electrolyte salt can be dissolved in the above solvent, but it is preferred that the lithium ion concentration is in the range of from 0.4 to 2.0 mol/kg, with respect to the non-aqueous solvent.

When using a gel electrolyte, a gel electrolyte is obtained by gelling an electrolyte solution mixture of a nonaqueous electrolyte solvent and an electrolyte salt by a matrix polymer.

As the matrix polymer, there can be used any polymer which is compatible with a nonaqueous electrolyte solution including an electrolyte salt dissolved in a non-aqueous solvent and which can gel the electrolyte solution.

Examples of the matrix polymers include polymers comprising polyvinylidene fluoride, polyethylene oxide, polypropylene oxide, polyacrylonitrile, or polymethacrylonitrile in repeating units. These polymers may be used individually or in combination.

Separator

The separator is formed of a porous film made of a polyolefin material, such as polypropylene (PP) or polyethylene (PE), or a porous film made of an inorganic material, such as ceramic nonwoven fabric, and may be composed of two or more porous films into a laminated structure. Of these, a polyethylene or polypropylene porous film may be more effective.

Generally, the usable separator preferably has a thickness of 5 to 50 μm, more preferably 7 to 30 μm. If the separator thickness is too large, the ratio of the active material to the separator is reduced to lower the battery capacity, and further the ion conduction properties become poor, so that the current properties become poor. On the other hand, if the separator thickness is too small, the film of separator is reduced in mechanical strength.

Fabrication of Battery

The gel electrolyte solution prepared as described above is uniformly applied to the positive electrode 51 and negative electrode 52 so that the cathode active material layer 51a and anode active material layer 52a are impregnated with the electrolyte solution, and then kept at room temperature or subjected to drying process to form gel electrolyte layers. Then, the positive electrode 51, the separator 53a, the negative electrode 52, and the separator 53b are stacked successively in this order and spirally wound together to form a battery element 59 by using the positive electrode 51 and negative electrode 52 each having a gel electrolyte layer formed thereon.

Figure 5:
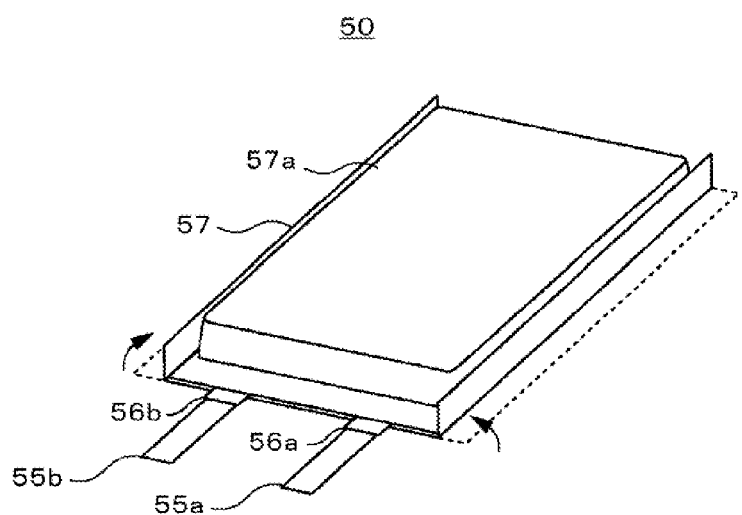
FIG. 5 is a perspective view showing the structure of a battery in a battery pack according to the first embodiment.

Then, the battery element 59 is covered with a flexible laminated film 57 and the laminated film is shaped to form a battery 50 shown in FIG. 5.

Figure 6:
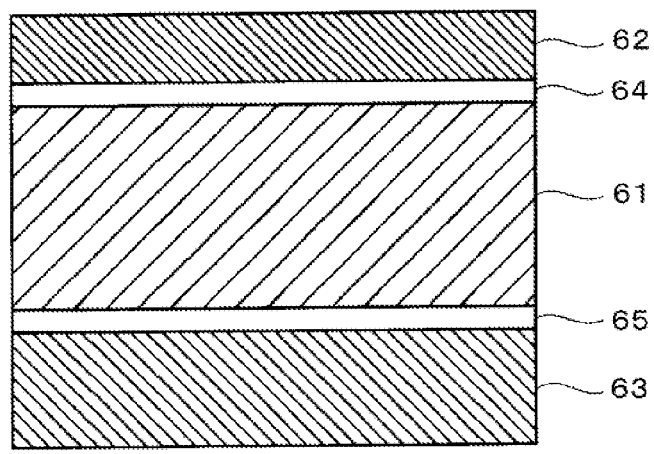
FIG. 6 is a cross-sectional view showing the structure of a flexible laminated film in a battery pack according to the first embodiment.

As the flexible laminated film 57, a laminated film having the structure shown in FIG. 6 is used. The flexible laminated film 57 is composed of a multilayer film having a moisture resistance and insulation properties, and including a metallic foil designated by reference numeral 61 sandwiched between an outer covering layer 62 composed of a resin film and a heat-bonding layer (hereinafter, frequently referred to as "sealant layer") 63 composed of a resin film.

With respect to the thickness of each of the outer covering layer 62, the metallic foil 61, and the sealant layer 63, there is no particular limitation, but the thicknesses of the outer covering layer, metallic foil, and sealant layer are respectively about 15 μm, about 35 μm, and about 30 μm.

The metallic foil 61 improves the casing member in strength, and further has the main role in preventing moisture, oxygen, or light from going into the battery to protect the contents, and stainless steel, iron plated with nickel, or the like is appropriately selected and used as a material for the metallic foil. From the viewpoint of reduced weight, excellent stretchability, low cost, and excellent workability, aluminum (Al) is more preferred, and the used of aluminum such as 8021O or 8079O may be preferred.

The metallic foil 61 and the outer covering layer 62, and the metallic foil 61 and the sealant layer 63 are individually bonded through bonding agent layers 64 and 65, respectively.

When the outer covering layer 62 or sealant layer 63 has heat bonding properties with the metal or an under coat layer which can be heat-bonded with the outer covering layer 62 or sealant layer 63 is formed on the surface of the metal, the bonding agent layer 64 can be omitted.

In the outer covering layer 62, for achieving good appearance, toughness, heat resistance, flexibility, and the like, polyolefin, polyamide, polyimide, or polyester, specifically, nylon (Ny), polyethylene terephthalate (PET), polyethylene (PE), or polyethylene naphthalate (PEN) is used, and these materials may be used in combination.

The sealant layer 63 is a portion to be fused due to heat or ultrasonic waves, and polyethylene (PE), cast polyethylene (CPE), cast polypropylene (CPP), polyethylene terephthalate (PET), nylon (Ny), low-density polyethylene (LDPE), high-density polyethylene (HDPE), or linear low-density polyethylene (LLDPE) may be used, and these materials may be used in combination.

General constituents of the laminated film are as follows: outer covering layer/metallic foil/sealant layer=Ny/Al/CPP. Instead of this combination, another combination shown below of general constituents of the laminated film may be used.

Specifically, outer covering layer/metallic foil/sealant layer=Ny/Al/PE, PET/Al/CPP, PET/Al/PET/CPP. PET/Ny/Al/CPP, PET/Ny/Al/Ny/CPP, PET/Ny/Al/Ny/PE, Ny/PE/Al/LLDPE, PET/PE/Al/PET/LDPE, or PET/Ny/Al/LDPE/CPP. As the metallic foil, a metal other than Al may be used.

Figure 7:
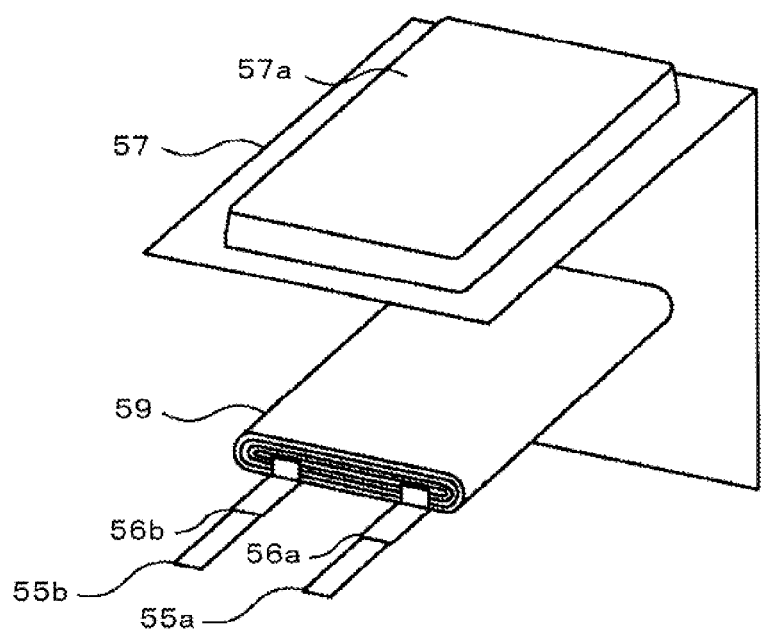
FIG. 7 is an exploded perspective view showing the structure of a battery in a battery pack according to the first embodiment.

As shown in FIG. 7, a recessed portion 57a is formed in the flexible laminated film 57 by deep-drawing, and the battery element 59 is housed in the recessed portion 57a, and then the opening of the recessed portion 57a is covered with the flexible laminated film 57.

Next, three sides of the flexible laminated film around the battery element 59 are heat-sealed under a reduced pressure to form a battery 50. In the heat sealing under a reduced pressure, the battery element 59 adheres to the flexible laminated film 57.

In a battery using an electrolyte solution, an electrolyte solution is injected at this time. Two sides of the flexible laminated film around the battery element are first heat-sealed, and then an electrolyte solution in a predetermined amount is injected through the remaining opening side, and finally the opening is heat-sealed to obtain a battery.

Figure 8A:
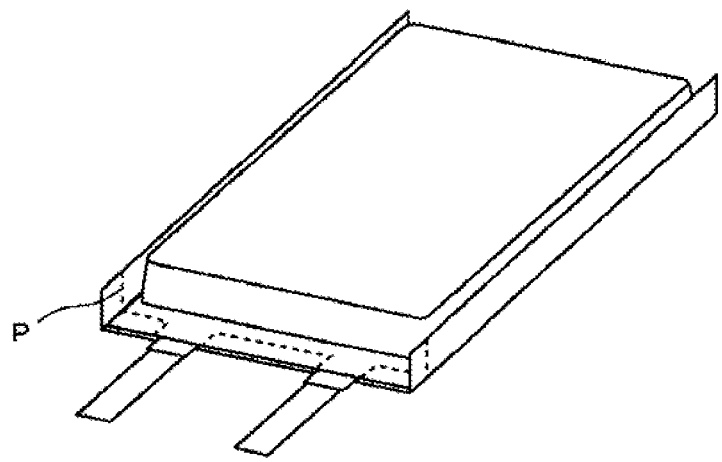
FIGS. 8A and 8B are perspective views showing the structure of a battery in a battery pack according to the first embodiment.
Figure 8B:
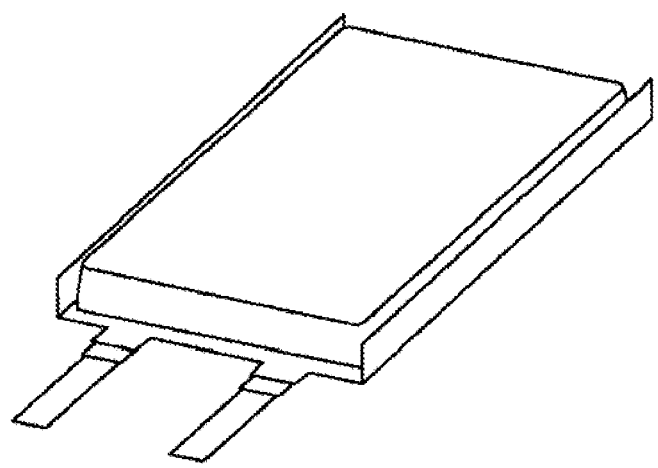

In the battery 50, considering the subsequent steps in the production, unnecessary portions of the top portion may be removed by trimming. As shown in FIGS. 8A and 8B, by trimming along the dotted lines designated by reference character P, for example, interference between the top cover and the flexible laminated film can be reduced.

Fabrication of Battery Assembly

The above-prepared battery is covered with a rigid laminated film to form a battery assembly. First, the structure of the rigid laminated film is described.

Figure 9:
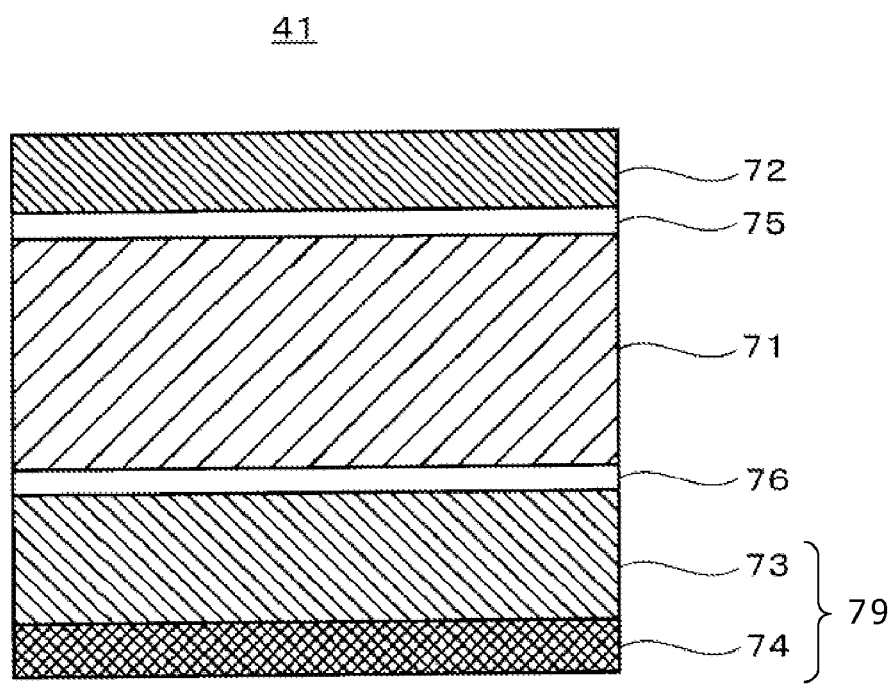
FIG. 9 is a cross-sectional view showing the structure of a rigid laminated film in a battery pack according to the first embodiment.

As shown in FIG. 9, the rigid laminated film 41 is composed of a multilayer film having a moisture resistance and insulation properties, including a metallic foil designated by reference numeral 71 sandwiched between an outer covering layer 72 composed of a resin film and a sealant layer 73 composed of a resin film, and having a bonding layer 74 under the sealant layer 73. In the present embodiment, the sealant layer 73 and bonding layer 74 together form a heat-bonding layer 79 (composite bonding layer) having heat bonding properties with nylon or the like.

In the rigid laminated film 41, with respect to the thickness of each of the outer covering layer 72, the metallic foil 71, and the heat-bonding layer (sealant layer 73+bonding layer 74), there is no particular limitation, but the thicknesses are respectively 115 μm or less, 330 μm or less, about 25 to 50 μm (sealant layer), and about 1 to 5 μm (bonding layer).

For securing strength, a rigid (hard) material is used, and the reason that the thickness of the outer covering layer 72 is 115 μm or less and the thickness of the metallic foil 71 is 330 μm or less resides in that the increase of the resistance of thermal conduction is prevented.

In the metallic foil 71, a hard metal material is used, and aluminum, stainless steel, copper, titanium, tinplate, galvanized steel, iron plated with nickel, or the like is appropriately selected and used as a material. Of these, aluminum (Al) or stainless steel (SUS) is preferable, and the used of aluminum such as 3003-H18, 3004-H18, and IN30-H18, or stainless steel such as SUS304 and SUS430, is especially preferable.

In the outer covering layer 72, for achieving good appearance, toughness, heat resistance, flexibility, and the like, nylon (Ny), polyethylene terephthalate (PET), or polyethylene naphthalate (PEN) is used, and these materials may be used in combination.

The sealant layer 73 is a portion to be fused due to heat or ultrasonic waves, and polyethylene (PE), cast polypropylene (CPP), polyethylene terephthalate (PET), nylon (Ny), low-density polyethylene (LDPE), high-density polyethylene (HDPE), or linear low-density polyethylene (LLDPE) may be used, and these materials may be used in combination.

The metallic foil 71 and the outer covering layer 72, and the metallic foil 71 and the sealant layer 73 are individually bonded through bonding agent layers 75 and 76, respectively.

The heat-bonding layer 74 bonds the battery 50 covered with the flexible laminated film 57 with the rigid laminated film 41 without using a separate bonding member.

Regarding the heat-bonding layer 74, a resin material having excellent bonding properties with Ny, PET, PEN, or the like used in the outer covering layer of the flexible laminated film 57 and having a melting temperature which does not adversely affect the battery element is used. Further, the resin material used in the heat-bonding layer 74 has a melting temperature lower than that of the material used in the sealant layer 73.

Specifically, an ethylene-vinyl acetate copolymer (EVA), an ethylene-acrylic acid copolymer, an ethyl acrylate copolymer, a methyl acrylate copolymer, a methacrylic acid copolymer, a methyl methacrylate copolymer, polyacrylonitrile, an ethylene-vinyl alcohol resin, a polyamide resin, a polyester resin, acid-modified polypropylene, or an ionomer may be used, and these materials may be used in combination. These materials may be used as a hot-melt adhesive or film or a weathering-resistant adhesive.

The sealant layer 73 serves as a sealing layer in the subsequent heat sealing of the top cover 42 and rear cover 43. Accordingly, a resin material having excellent bonding properties with the top cover 42 and rear cover 43 is selected. In addition, the sealant layer exhibits a cushioning effect in bonding the rigid laminated film 41 with the battery 50.

Specifically, in heat sealing the flexible laminated film 57 as a casing member for the battery 50 with the rigid laminated film 41 through the heat-bonding layer 74, there is a possibility that they are not satisfactorily bonded together due to the finely uneven surfaces of the individual laminated films. When the sealant layer 73 having a thickness of about 25 to 50 μm is formed, the sealant layer 73 exhibits a cushioning effect, so that the laminated films having finely uneven surfaces can be well bonded together.

The bonding state between the flexible covering member and the rigid covering member, which is the characteristic feature of embodiments resides is described.

As described above, in the battery pack of embodiments, the flexible covering member and the rigid covering member are bonded with an adhesive strength equal to or higher than atmospheric pressure and with a peel strength equal to or lower than a breaking strength of the flexible covering member.

If the adhesive strength is lower than atmospheric pressure, the following disadvantage is caused. When peel stresses are exerted on the portion between the rigid laminated film as a rigid covering member and the battery body due to a certain factor, the rigid laminated film is easily peeled, and cannot solely resist buckling stresses in drop or the like and hence is likely to suffer buckling or the like. Specifically, the adhesive strength is preferably 0.1 MPa or more, more preferably 0.1 to 0.5 MPa, further preferably 0.2 to 0.4 MPa.

If the peel strength is higher than a breaking strength of the flexible covering member, the following disadvantage is caused. When the rigid laminated film as a rigid covering member is peeled by a certain factor, the flexible laminated film as a flexible covering member is stretched and broken, or the flexible laminated film is not broken, but a crack or pinhole is caused in the metal layer. Specifically, the peel strength is preferably 5 N/mm or less, more preferably 1 to 5 N/mm, further preferably 2 to 4 N/mm.

For achieving the adhesive strength and peel strength in the above respective ranges, for example, the flexible covering member and the rigid covering member are bonded so that the outer covering layer of the flexible covering member is not melted and the bonding layer of the rigid covering member is melted. Specifically, the flexible laminated film 57 and the rigid laminated film 41 are bonded together, but the outer covering layer 62 of the flexible laminated film 57 is not melted and the heat-bonding layer 79 (sealant layer 73+bonding layer 74) of the rigid laminated film 41 is melted.

The state of bonding is not limited to this as long as the adhesive strength and peel strength are in the above respective ranges.

By providing the bonding state showing the ranges of the adhesive strength and peel strength, the battery pack has the following advantages. The battery pack has strength such that, if the battery pack suffers shock or impact/shock of drop or the like and excess peel stresses are exerted on the portion between the rigid laminated film 57 and the flexible laminated film 41, the flexible laminated film 41 is stretched and the rigid laminated film 57 is removed before a pinhole or breakage is caused. Further, if small stresses are exerted on the laminated films, the rigid laminated film 57 is unified with the battery element due to atmospheric pressure and stretch strength of the flexible laminated film 41, so that the battery pack can resist deformation.

As a result, the battery pack of embodiments has appropriate strength. Specifically, when the battery pack suffers an impact/shock of drop such that the flexible covering member is not damaged, no defect is caused in the external view of the pack, which indicates that the battery pack can be subsequently used. Further, when the battery pack suffers an impact/shock of drop such that the flexible covering member is damaged, the rigid casing is first peeled or removed, which indicates that the battery pack cannot be used any more. Accordingly, the battery pack can prevent the occurrence of gas generation due to breakage of the flexible casing or battery expansion which possibly damages an electronic device.

Next, the relationship between the flexible covering member and the rigid covering member for achieving the above-mentioned state of bonding and others are described.

To bond the same type of materials, the strength can generally be increased. To bond different type of materials, the strength level can be achieved at a predetermined level or lower.

Further, by selecting a material which is melted at a temperature lower than the melting temperature of a bonding subject as the heat-bonding layer and heating is conducted at a temperature at which the bonding subject is not melted, the bonding strength can be controlled to be at a predetermined level or lower.

In an embodiment, by using these techniques in combination, basically, a material having a heat resistance, e.g., nylon is used in the outer covering layer of the flexible covering member, and a material which is different from nylon and which is melted at a temperature at which nylon is not melted to exhibit bonding properties, e.g., cast polypropylene or EVA is used in the heat-bonding layer of the rigid covering member, thus achieving strength of the battery pack such that, as described above, if excess peel stresses are exerted on the laminated films upon drop of the battery pack or the like, the laminated film of the flexible covering member is stretched and the rigid covering member is removed before a pinhole or breakage is caused.

Thus, in an embodiment, it is preferred that the outer covering layer of the flexible covering member is composed of a material which is different from the material for the heat-bonding layer of the rigid covering member, and which includes solely or a combination of at least one oriented resin material selected from the group consisting of polyolefin, polyamide, polyimide, and polyester.

When different materials are melted or only one material is melted, there is a tendency that a difference between the temperature at which bonding starts and the temperature at which the both materials are melted becomes smaller. The reason for this is that the battery itself is a heat sink and continues taking heat and hence it is difficult to keep the temperature of the melted heat-bonding layer constant.

This similarly occurs when the temperature of a heater is controlled in the production of the battery pack.

For keeping the temperature of the sealing interface ideal during the bonding, heat transfer between the heating portion and the sealing interface is required to be satisfactorily fast, and heat transfer of the inside of the interface is preferably slow to some extent to facilitate heat storage.

In an embodiment, it is preferred that the outer covering layer and metal layer stacked together in the rigid covering member have a thermal conductivity of 1,000 $Wm^{-2}K^{-1}$ or more per area. In this case, satisfactory heat can be supplied to the heat-bonding layer.

With respect to the heat source used in bonding, specifically, heat sealing, by disposing a material having a thermal conductivity of 1 or less on the battery element side of the sealing interface, i.e., the interface between the heat-bonding layer of the rigid covering member and the outer covering layer of the flexible covering member, the temperature of the sealing interface can be kept constant.

Particularly, the outer covering layer of the rigid covering member has poor thermal conduction, and therefore, it is desired to select a combination of the outer covering layer having a thermal conductivity of 1,050 $Wm^{-2}K^{-1}$ or more per area and having a thickness of 100 μm or less and the hard metal layer having a thermal conductivity of 50,000 $Wm^{-2}K^{-1}$ or more per area and having a thickness of 330 μm or less.

Thus, in an embodiment, as a material constituting the outer covering layer of the rigid covering member, polyamide (e.g., oriented nylon 6), polyester (e.g., polybutylene terephthalate, polyethylene terephthalate, or polyethylene naphthalate), polyolefin (e.g., oriented polypropylene or oriented polyethylene), or the like is preferably used.

When the outer covering layer of the flexible covering member has a thermal conductivity of 1 or less on the battery element side of the sealing interface, heat amount of the sealing interface is easier to control. Further, it is preferred that a material having a melting temperature higher than the heat-bonding temperature of the rigid covering member is selected for the outer covering layer of the flexible covering member.

As a material constituting the outer covering layer of the flexible covering member, polyamide (e.g., oriented nylon 6), polyester (e.g., polybutylene terephthalate, polyethylene terephthalate, or polyethylene naphthalate), or polyolefin (e.g., oriented polypropylene or oriented polyethylene) is preferred.

By selecting the materials as described above, in embodiments, the contact or integration of the flexible covering member and the rigid covering member or a composite layer thereof can be achieved.

The production of a battery assembly is described again with reference to the drawings. The casing member composed of the rigid laminated film 41 described above is bonded with the battery 50.

Figure 10A:
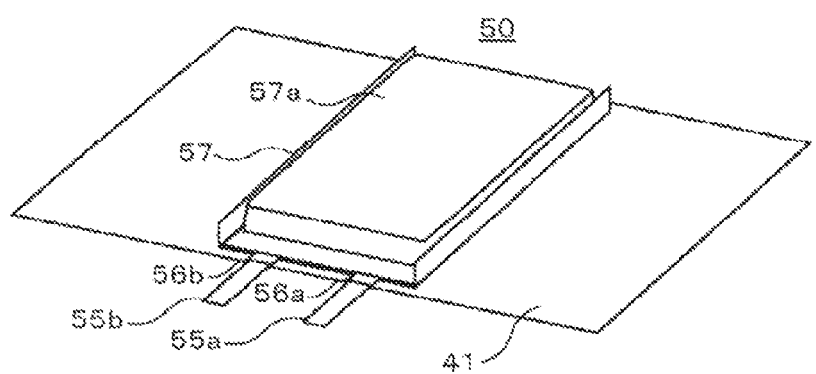
FIGS. 10A and 10B are perspective and cross-sectional views showing the structure of a battery assembly in a battery pack according to the first embodiment.

First, as shown in FIG. 10A, the rigid laminated film 41 is folded so that the battery 50 is wrapped in the rigid laminated film and the ends of the rigid laminated film 41 are touching on the top surface of the battery 50.

Figure 10B:
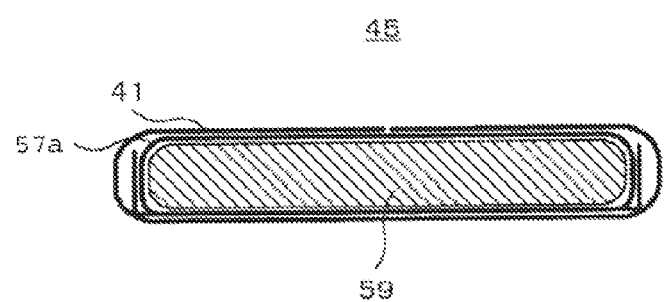

Then, heater blocks are put on the top surface and bottom surface of the battery 50 to heat the surfaces at such a temperature that the resin material for the heat-bonding layer 74 is melted while applying a pressure. The resin material is melted and serves as a bonding agent to bond the rigid laminated film 41 with the battery 50. In this instance, the heating is controlled so that the outer covering layer 62 of the flexible laminated film 57 is not melted, thus forming a battery assembly 45 having a cross-section shown in FIG. 10B.

The temperature of the heater block varies depending on the type of resin material for the heat-bonding layer 74, but it is a temperature which is equal to or higher than the melting temperature of the resin material for the heat-bonding layer and which is lower than the melting temperature of the material constituting the outer covering layer 62 of the flexible laminated film 57. By selecting a temperature in this range, the rigid laminated film can be bonded with the battery without melting the resin material constituting the outer covering layer 62 of the flexible laminated film 57.

The rigid laminated film can be joined to or bonded with the battery using an adhesive or the like, but the joint using heat achieves higher resistance to peel stress continuously applied.

The heating temperature of higher than 120° C. seems to adversely affect the battery element.

For example, polyethylene (PE) is frequently used in the separator for battery element. The heating temperature of higher than 120° C. possibly lowers the safety or battery functions since PE has a melting temperature of about 120° C. Thus, it is desired that the upper limit of the temperature of the heater block used for heating is about 110° C.

As described above, in embodiments, the battery element 59 is sealed in the flexible laminated film 57 during deaeration, so that the electrodes and the separator are fixed to one another due to atmospheric pressure, causing the whole of the battery element 59 to be a unified structure.

Further, the electrodes and separator are joined through a solid non-aqueous electrolyte, and hence the structure has a resistance to drop impact/shock, for example, a phenomenon in which the wound layers or stacked layers in the battery element separate is unlikely to occur.

The device components are sealed while conducting deaeration and hence the flexible laminated film 57 is closely fixed to the battery element 59 due to atmospheric pressure, so that the resultant structure has a higher resistance to external stresses than that of the individual unfixed components.

Further, in embodiments, the flexible laminated film and the rigid laminated film can be joined together with bonding strength larger than atmospheric pressure, and the joint of them is stronger than atmospheric pressure. Accordingly, under conditions such that a peel load for peeling the flexible laminated film off the battery element is not exerted on the rigid laminated film, the rigid laminated film is unified with the flexible laminated film and battery element by atmospheric pressure and functions as a battery pack housing having a resistance to buckling caused in short drop or the like.

Instead of the structure shown in FIG. 10, the rigid laminated film may have any one of the structures shown in FIGS. 11 to 15.

In these structures, similarly, the heat-bonding layer 74 of the rigid laminated film is melted and the outer covering layer 62 of the flexible laminated film is not melted.

Figure 11A:
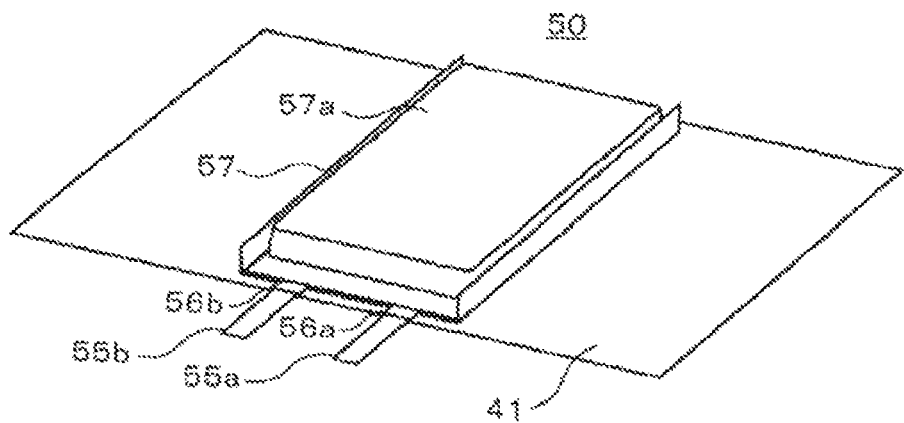
FIGS. 11A and 11B are perspective and cross-sectional views showing the structure of a battery assembly in a battery pack according to the first embodiment.
Figure 11B:
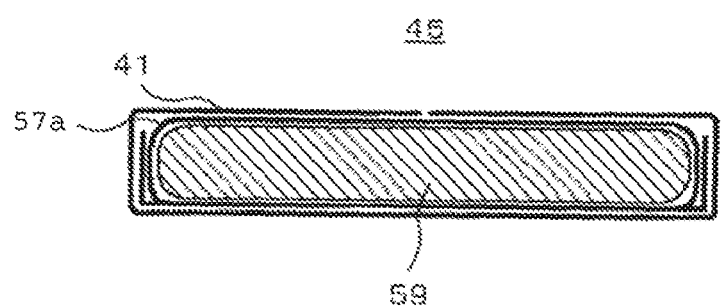

FIGS. 11A and 11B show a structure of the battery assembly 45 in which the rigid laminated film 41 covers the bottom surface portion of the battery 50 and the joint line of the ends of the rigid laminated film 41 is positioned on the top surface portion of the battery assembly 45. The battery assembly shown in FIG. 10 is shaped so that the cross-section has a rounded side portion, whereas the battery assembly shown in FIG. 11 has a cross-section of a substantially rectangular form.

Figure 12A:
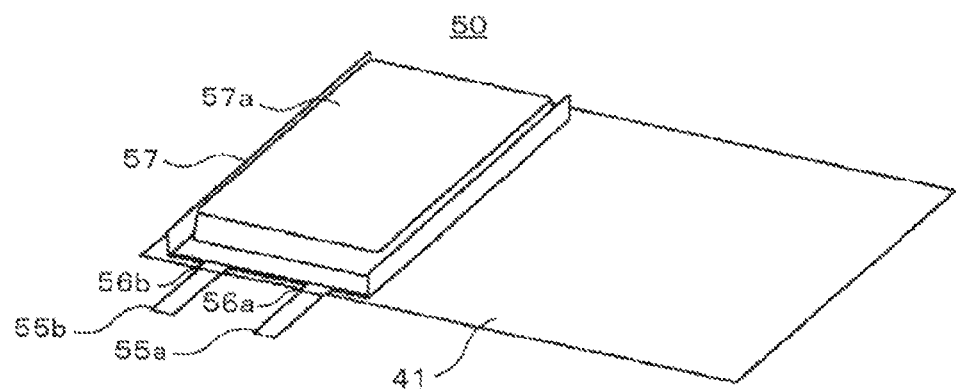
FIGS. 12A and 12B are perspective and cross-sectional views showing the structure of a battery assembly in a battery pack according to the first embodiment.
Figure 12B:
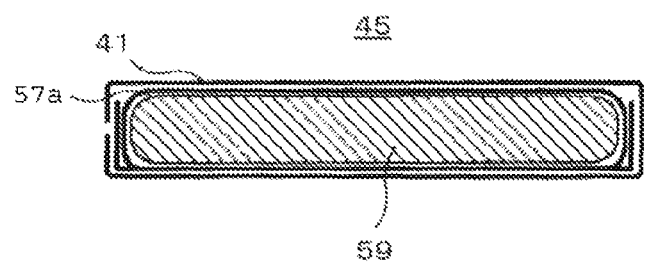

FIGS. 12A and 12B show a structure of the battery assembly 45 in which the rigid laminated film 41 covers one side portion of the battery 50 and the joint line of the ends of the rigid laminated film 41 is positioned on another side portion of the battery assembly 45.

Figure 13A:
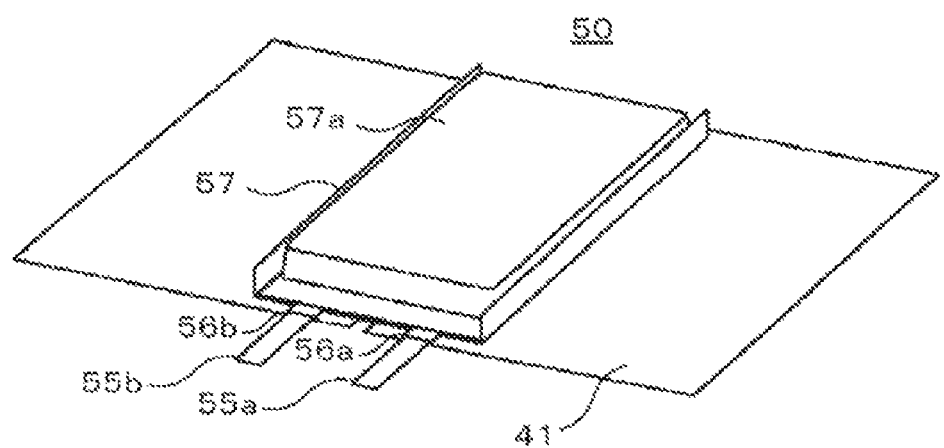
FIGS. 13A and 13B are perspective and cross-sectional views showing the structure of a battery assembly in a battery pack according to the first embodiment.
Figure 13B:
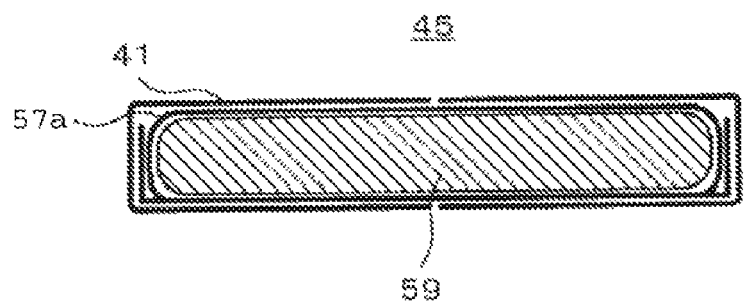

FIGS. 13A and 13B show a structure of the battery assembly 45 in which two rigid laminated films 41 respectively cover both side portions of the battery 50 and the joint lines of the ends of the rigid laminated films 41 are respectively positioned on the top surface portion and bottom surface portion of the battery assembly 45.

Figure 14A:
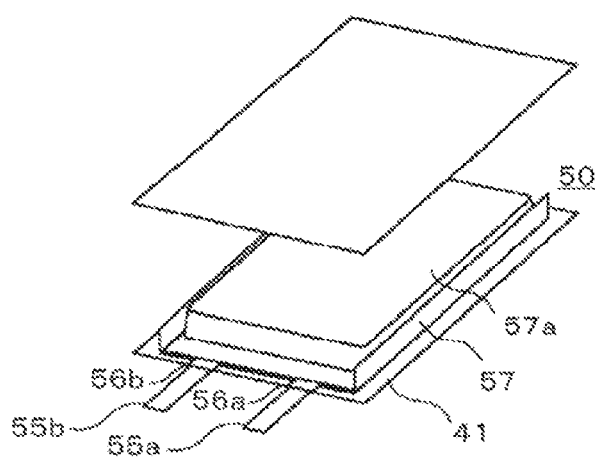
FIGS. 14A and 14B are perspective and cross-sectional views showing the structure of a battery assembly in a battery pack according to the first embodiment.
Figure 14B:
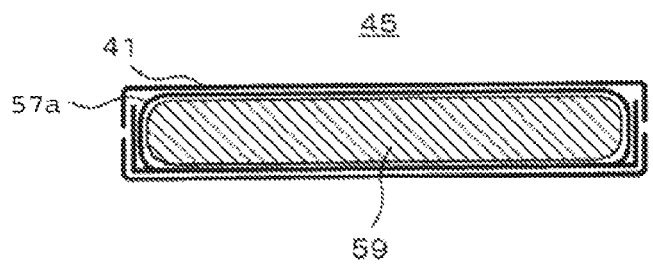

FIG. 14A and FIG. 14B show a structure of the battery assembly 45 in which two rigid laminated films 41 respectively cover the top surface portion and bottom surface portion of the battery 50 and the joint lines of the ends of the rigid laminated films 41 are respectively positioned on both side portions of the battery assembly 45.

Figure 15A:
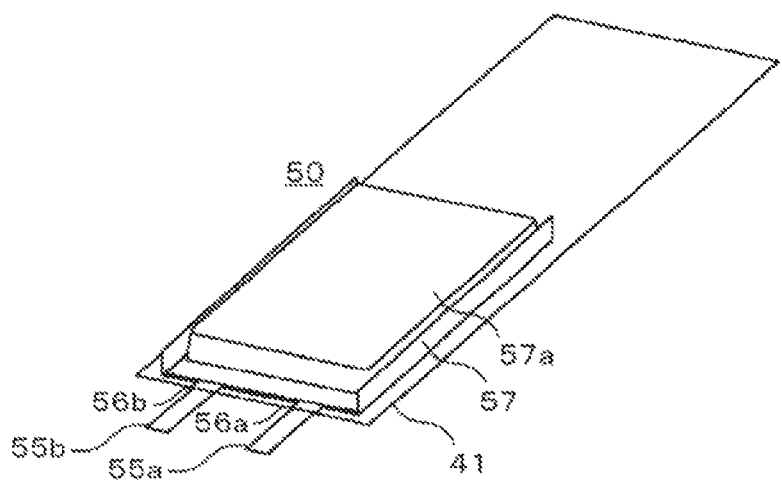
FIGS. 15A and 15B are perspective and cross-sectional views showing the structure of a battery assembly in a battery pack according to the first embodiment.
Figure 15B:
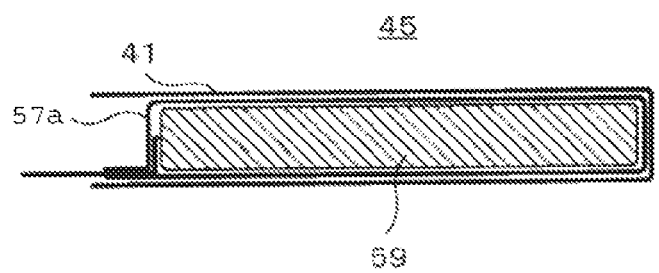

FIGS. 15A and 15B show a structure of the battery assembly 45 in which the rigid laminated film 41 is folded to cover the bottom portion of the battery 50. FIG. 15B is a cross-sectional view as viewed from the side of the battery assembly 45.

Fabrication of Battery Pack

Subsequently, the circuit board 44 is connected to the positive electrode terminal 55a and negative electrode terminal 55b (see FIG. 3).

The positive electrode terminal 55a and negative electrode terminal 55b extended from the top portion of the battery assembly 45 molded into a predetermined shape are welded to a protection circuit previously mounted on the circuit board 44 by resistance welding, ultrasonic welding, or the like.

The circuit board 44 connected to the battery element 59 is inserted into a top cover 42 including an upper holder 42a and a lower holder 42b which are molded in advance and fitted to each other.

The circuit board 44 is mounted thereon a protection circuit including a temperature protection element such as a fuse, a PTC, or a thermistor, an ID for identifying the battery pack, and a resistor, and is further formed a plurality of contact portions, to form the circuit board. The protection circuit is also used to a protection circuit including an IC for monitoring the secondary battery and controlling a field effect transistor (FET), and a protection circuit including a charge-discharge control FET are used.

The PTC element is connected to the battery element in series. If the temperature of the battery is higher than the preset temperature, the PTC element rapidly increases in electrical resistance to substantially cut off the electric current flowing the battery. The fuse or thermistor is also connected to the battery element in series. If the temperature of the battery is higher than the preset temperature, it cuts off the electric current flowing the battery.

Overcharging, for example, exceeding 4.3 to 4.4 V of the secondary battery terminal voltage, may result in heating or ignition of the battery. Thus, the protection circuit including an IC for monitoring the secondary battery and controlling the FET and a charge-discharge control FET monitors the voltage of the secondary battery and switches off the charge control FET to cut-off charging when exceeding 4.3 to 4.4 V.

Further, if the secondary battery is over-discharged until the terminal voltage of the secondary battery becomes the discharge cut-off voltage or lower and the secondary battery voltage is 0 V, there is a possibility that the secondary battery suffers internal short-circuiting, making it unable to recharge the battery. Thus, the protection circuit monitors the secondary battery voltage and switches off the discharge control FET to cut-off discharging when the voltage is lower than the discharge cut-off voltage.

The top and bottom of the circuit board 44 joined to the battery assembly 45 are covered with the upper holder 42a and lower holder 42b previously molded by injection molding, and the lower holder 42b is fitted to the upper holder 42a, so that the circuit board is housed in the top cover 42.

Then, the direction of the top cover 42 is changed so that the lower holder 42b is near the battery assembly 45, and the top cover 42 is fitted to the opening in the top portion of the battery assembly 45 so that the positive electrode terminal 55a and negative electrode terminal 55b are bent in the battery assembly 45.

Subsequently, the fitting portion of the top cover 42 and battery assembly 45 is heated by a heater head to heat-seal the top cover 42 and battery assembly 45. When the top cover 42 and the battery assembly 45 is heat-sealed, the temperature of the heater head is higher than the temperature in forming the battery assembly and equal to or higher than the melting temperature of the resin material for the sealant layer 73, and the top cover 42 is not bonded with the heat-bonding layer 74 but with the sealant layer 73.

The heat-bonding layer 74 heated at the time of bonding the rigid laminated film 41 and battery 50 is pushed by the top cover 42 upon fitting the top cover 42 and moved to the inside of the battery assembly 45.

As described above, since a resin material having a melting temperature lower than that of the sealant layer 73 is used as the heat-bonding layer 74, only the heat-bonding layer 74 is melted at the time of bonding the rigid laminated film 41 and battery 50. Thus, the heat-bonding layer 74 is moved without moving the sealant layer 73 used for bonding the top cover 42, making it possible to expose the sealant layer 73.

When the top cover 42 and the battery assembly 45 are heat-sealed, a bonding agent or a warmed resin material (hot-melt resin) may be put into a space between the battery 50 and the top cover 42 as required. In this case, an inlet for bonding agent or hot-melt resin is previously formed in the top cover 42.

The use of a bonding agent or hot-melt resin further improves the bonding properties of the battery assembly 45 with the top cover 42. In the case of injecting a hot-melt resin, it is required that the circuit board 44 does not suffer deformation or damage due to heat.

Subsequently, the rear cover 43 is fitted to the bottom portion of the battery assembly 45, and the fitting portion of the rear cover 43 and battery assembly 45 is heated by a heater head to heat-seal the rear cover 43 and battery assembly 45. In this case, like the top cover 42, the heat-bonding layer 74 is pushed by the rear cover 43 upon fitting the rear cover 43 and moved to the inside of the battery assembly 45, so that the exposed sealant layer 73 and the rear cover 43 are bonded with each other.

When the rear cover 43 and the battery assembly 45 is head-sealed, as in the case of the top cover 42, a bonding agent or a hot-melt resin may be put into a space between the battery 50 and the rear cover 43 as required. Also in this case, an inlet for bonding agent or hot-melt resin is previously formed in the rear cover 43. The steps for fitting and heat sealing the top cover 42 and rear cover 43 may be conducted simultaneously.

With respect to the rear cover 43, a previously molded member can be used as described above. The rear cover also can be formed of a method in which the battery assembly 45 is placed in a mold and a hot-melt resin is put into the bottom portion of the mold and molded together with the battery assembly 45 into a unified shape.

When a resin material having good bonding properties with the top cover 42 and rear cover 43 is formed as the sealant layer 73 on the inner side of the metallic foil 71 and further the heat-bonding layer 74 using a resin material having good bonding properties with the outer covering layer 62 of the flexible laminated film 57 and having a melting temperature lower than that of the sealant layer 73 is formed on the inner side of the sealant layer 73 as described above, the battery 50 can be firmly bonded with the rigid laminated film 41 and the battery assembly 45 can be firmly bonded with the top cover 42 and rear cover 43. Thus, the resultant battery pack 40 has a structure unlikely to suffer damage.

Finally, a product label is attached to cover the joint line of the ends of the rigid laminated film 41 caused on part of the battery pack 40, thus obtaining a battery pack 40 shown in FIG. 2. The product label 46 is optionally attached to the battery pack.

Figure 16:
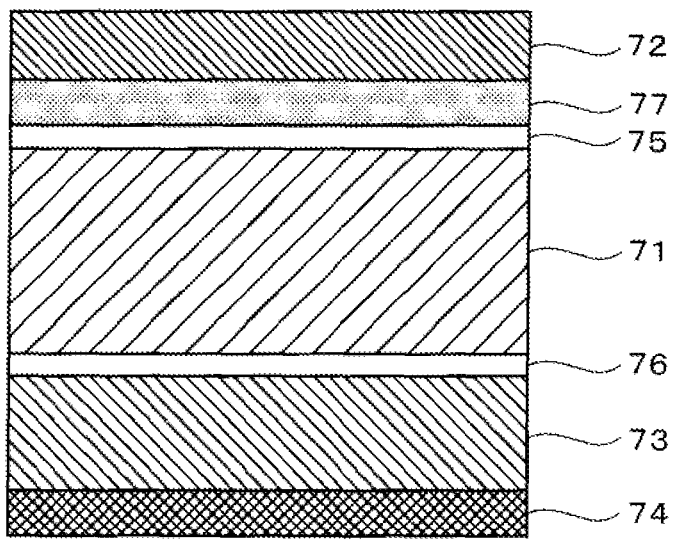
FIG. 16 is a cross-sectional view showing another example of the structure of a rigid laminated film.

Instead of the product label 46, the rigid laminated film 41 can be subjected to printing, baking coating, or the like. For example, as shown in FIG. 16, a printing layer 77 on which desired patterns, characters, or the like are printed may be formed on the inner side (on the metallic foil side) of the outer covering layer 72 of the rigid laminated film 41 so that the printed patterns or characters may be seen through the outer covering layer 72.

Figure 17:
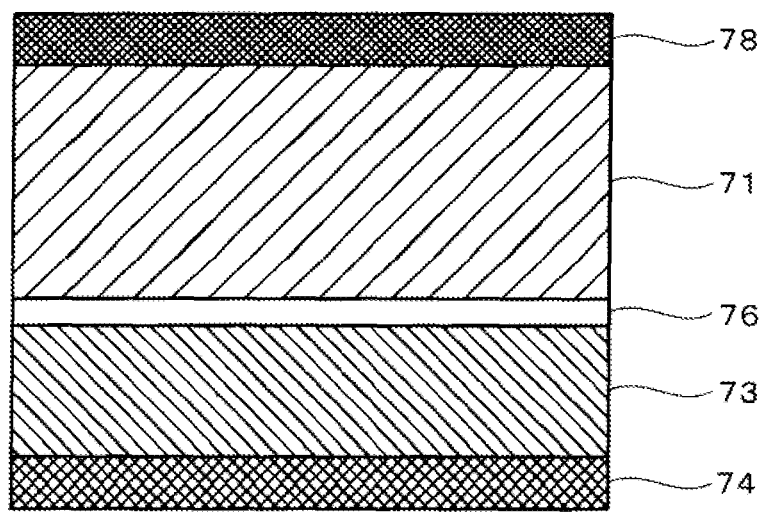
FIG. 17 is a cross-sectional view showing another example of the structure of a rigid laminated film.

In this case, the inversed patterns or characters are printed. Alternatively, as shown in FIG. 17, a baking coat 78 may be formed using a laser or the like on the outer side of the metallic foil 71. In this case, the rigid laminated film has a structure such that the outer covering layer 72 and the bonding layer for bonding the outer covering layer 72 with the metallic foil 71 are not formed and the metallic foil 71 having formed the baking coat 78 is exposed.

The battery pack 40 produced as described above can secure resistance against external shock.

By using a metal material such as a rigid laminated film as a casing, even when the battery having a laminated casing is penetrated with a nail, heat generation occurs only at the battery surface, and heat radiation is promoted. Accordingly heat generation in the battery can be prevented, thereby providing a safer battery pack.

Second Embodiment

In the second embodiment, a battery pack using a rigid laminated film having a three-layer structure as a casing member is described.

The pack structure of the battery pack according to an embodiment of present application is similar to that in the first embodiment shown in FIGS. 2 and 3. Further, the battery element and battery are similar to those in the first embodiment, and thus the descriptions of them are omitted.

Fabrication of Battery Assembly

Figure 18:
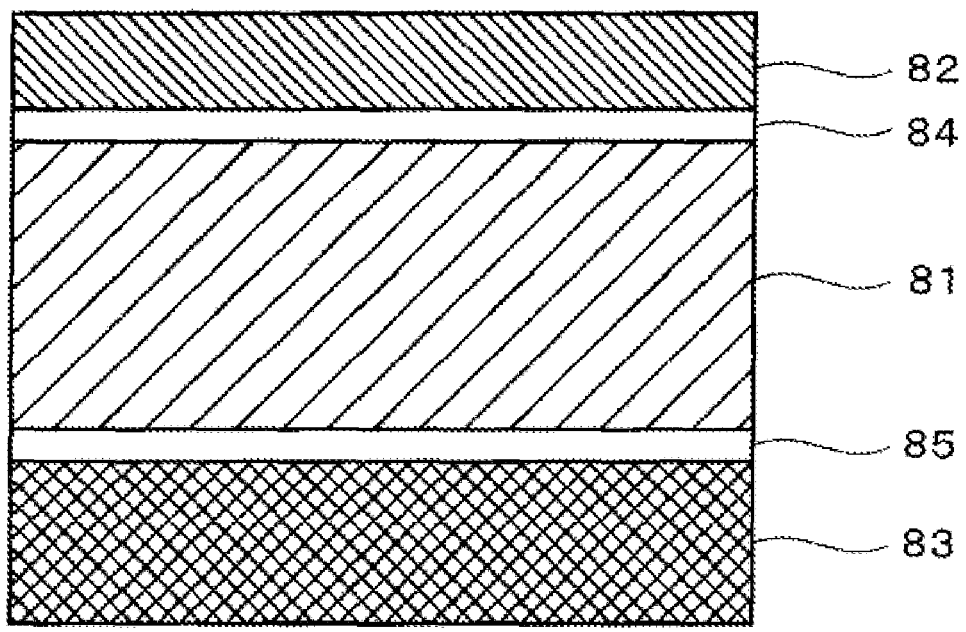
FIG. 18 is a cross-sectional view showing the structure of a rigid laminated film in a battery pack according to a second embodiment.

A battery 50 is covered with a rigid laminated film 80 having a three-layer structure shown in FIG. 18 to fabricate a battery assembly. First, the structure of the rigid laminated film 80 is described.

As shown in FIG. 18, the rigid laminated film 80 in the second embodiment is composed of a multilayer film having a moisture resistance and insulation properties, and including a metallic foil designated by reference numeral 81 sandwiched between an outer covering layer 82 composed of a resin film and a heat-bonding layer 83.

As materials for the metallic foil 81 and outer covering layer 82, materials similar to those in the first embodiment can be used.

The metallic foil 81 and the outer covering layer 82, and the metallic foil 81 and the heat-bonding layer 83 are individually bonded through bonding agent layers 84 and 85, respectively.

The heat-bonding layer 83 is used for bonding the battery 50 covered with the flexible laminated film 57 and the rigid laminated film 80 without using a separate member for bonding.

In the second embodiment, a material having good bonding properties with a resin used in the outer covering layer 62 of the battery 50 such as Ny, PET, or PEN, and with a resin used as a material for the top cover 42 and rear cover 43 such as PP, and having high reactivity is used in the heat-bonding layer 83, and therefore a battery pack can be produced without the sealant layer 73 formed in the first embodiment.

With respect to the above material, specifically, acid-modified polypropylene, an ionomer resin, an ethylene-vinyl acetate copolymer, an ethylene-acrylic acid copolymer, an ethyl acrylate copolymer, a methyl acrylate copolymer, a methacrylic acid copolymer, a methyl methacrylate copolymer, polyacrylonitrile, an ethylene-vinyl alcohol resin, polyamide, polyester, or the like can be used. Of these, especially preferred is acid-modified polypropylene, an ionomer resin, or an ethylene-vinyl alcohol resin. These materials may be used as a hot-melt adhesive or film or a weathering-resistant adhesive.

In the rigid laminated film 80 in the second embodiment, the heat-bonding layer 83 has a thickness of about 25 to 50 μm. The metallic foil 81 and outer covering layer 82 may individually have thicknesses equivalent to those in the first embodiment. In the rigid laminated film 41 in the first embodiment, the heat-bonding layer 74 has a thickness of 1 to 5 μm, but, in the second embodiment, the heat-bonding layer 83 has a larger thickness and hence, the heat-bonding layer 83 itself exhibits a cushioning effect to improve the bonding properties.

The casing member formed of the rigid laminated film 80 is bonded with the battery 50. As in the case of the first embodiment, the rigid laminated film 80 is folded so that the battery 50 is wrapped in the rigid laminated film to touch the end of the rigid laminated film 80 at the top surface of the battery 50.

Then, heater blocks are put on the top surface and bottom surface of the battery 50 to heat the surfaces at such a temperature that the resin material for the heat-bonding layer 83 is melted while applying a pressure. The resin material is melted and serves as a bonding agent to bond the rigid laminated film 80 with the battery 50. When bonding the rigid laminated film 80 with the battery 50, as in the case of the first embodiment, the outer covering layer 62 of the flexible laminated film is subjected to a process so as not to melt, thus forming a battery assembly 45.

The temperature of the heater block varies depending on the type of resin material for the heat-bonding layer, but it may be equal to or higher than the melting temperature of the resin material for the heat-bonding layer 83. The heating temperature of higher than 120° C. is considered to adversely affect the battery element 59. From this point of view, it is desired that the upper limit of the temperature of the heater block used for heating is about 110° C.

Fabrication of Battery Pack

Next, the circuit board 44 is connected to the positive electrode terminal 55a and negative electrode terminal 55b. A method for connecting the positive electrode terminal 55a and negative electrode terminal 55b to the circuit board 44 is the same as that in the first embodiment, and therefore the descriptions are omitted.

The top cover 42 containing therein the circuit board 44 is fitted to the opening of the battery assembly 45 on the top side. Then, the fitting portion of the top cover 42 is heated by a beater head to heat-seal the top cover 42 and battery assembly 45.

In the present embodiment, as the resin material for the heat-bonding layer 83, a resin material having good bonding properties with the top cover 42 and rear cover 43 is used, and therefore the top cover 42 is bonded with the heat-bonding layer 83. In addition, like the top cover 42, the rear cover 43 can be similarly bonded with the battery assembly 45.

In this instance, a bonding agent or a warmed resin material (hot-melt resin) may be put into a space between the battery 50 and the top cover 42 as required. In this case, inlets for bonding agent or hot-melt resin are previously formed in the top cover and rear cover. The injection of a bonding agent or hot-melt resin further improves the bonding properties of the battery assembly 45 with the top cover 42 and rear cover 43. In the case of injecting a hot-melt resin from the top cover 42, it is required that the circuit board does not suffer deformation or damage due to heat.

With respect to the rear cover 43, a previously molded member can be used as described above. Alternatively, the rear cover can be formed of a method in which the battery assembly 45 is placed in a mold and a hot-melt resin is put into the bottom portion of the mold and molded together with the battery assembly 45 into a unified shape.

Hereinabove, the battery pack 40 according to the second embodiment using the rigid laminated film 80 having a three-layer structure as a casing member is described.

There can be provided a battery pack having excellent effect of the battery pack according to the first embodiment exhibited upon the drop and the like. A safer battery pack having a secure resistance against external shock is provided by appropriately selecting a resin material used in the heat-bonding layer 83 and it has satisfactory moisture penetration resistance and heat release property even if a sealant layer is provided.

Third Embodiment

Figure 19A:
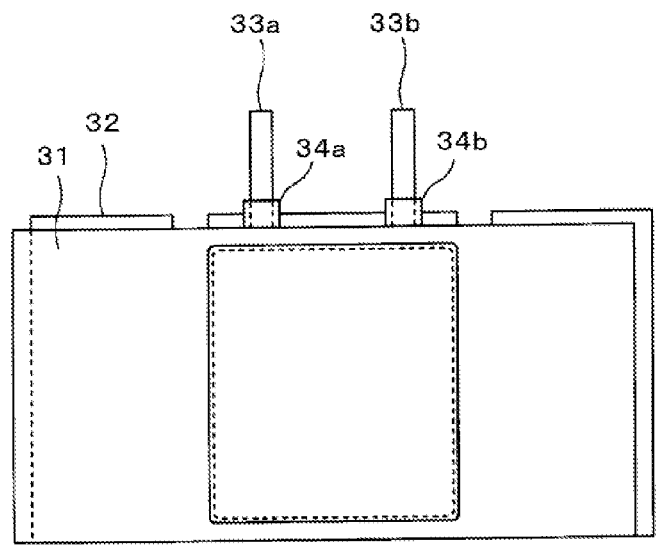
FIGS. 19A to 19C are top and side views showing a battery pack according to a third embodiment.
Figure 19B:
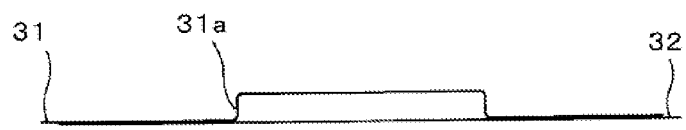
Figure 19C:
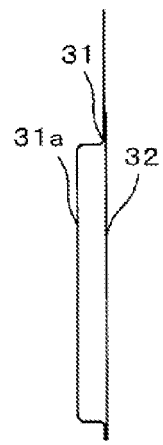

FIGS. 19A to 19C show a battery pack according to another embodiment.

FIGS. 19A to 19C and FIGS. 20A and 20B are diagrammatic views showing a battery in the battery pack according to another embodiment, which is in the process of fabrication.

In another embodiment, using a flexible laminated film 31 having a recessed portion 31a and a rigid laminated film 32, a principal portion of a battery element, i.e., a portion of a battery element 35 constituting a hexahedron, excluding one principal surface, is covered with the flexible laminated film 31 so that the battery element 35 is housed in the recessed portion 31a (see FIG. 20).

Then, the rigid laminated film 32 is positioned so that it covers the remaining portion of the battery element 35, i.e., one principal surface of the battery element 35, typically, the opening of the recessed portion 31a, and the stacked flexible laminated film 31 and rigid laminated film 32 around the battery element 35 are sealed. In this instance, heat sealing wider a reduced pressure is similar to that in the first embodiment, and the battery element 35 adheres to the flexible laminated film 31 and rigid laminated film 32 by the heat sealing under a reduced pressure.

Figure 20A:
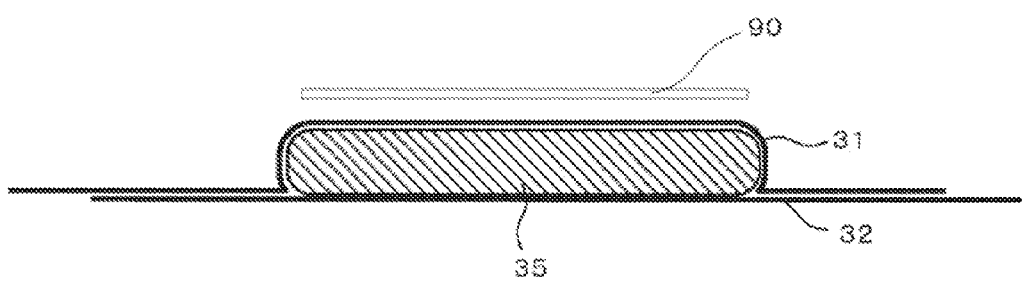
FIGS. 20A and 20B are cross-sectional views showing a battery pack according to the third embodiment.
Figure 20B:
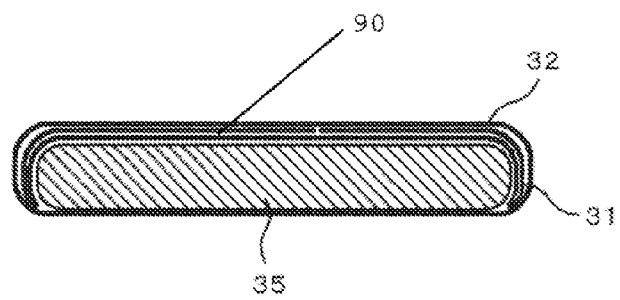

As shown in FIG. 20B, the rigid laminated film 32 and flexible laminated film 31 are shaped so that they cover the battery element 35, but, in this embodiment, a heat-bonding resin tape 90 is prepared, and the tape 90 is disposed between the outer covering layer of the folded flexible laminated film 31 and the outer covering layer of the flexible laminated film 31 covering the battery element 35 and melted to bond together these flexible laminated films.

Simultaneously, the heat-bonding layer of the rigid laminated film 32 is melted and bonded with the heat-bonding layer of the folded flexible laminated film 31. In this instance, the outer covering layer of the flexible laminated film 31 is subjected to a process so as not to melt. The heat-bonding resin tape 90 may have a substrate, as in the case of the first embodiment.

Then, a circuit board (not shown) and resin molded covers are provided to produce a battery pack having the rigid laminated film 32 as the outermost layer. The battery pack produced has not only good volume efficiency and high battery strength but also excellent effect of the battery pack according to the first embodiment exhibited upon the drop and the like.

Fourth Embodiment

Figure 21A:
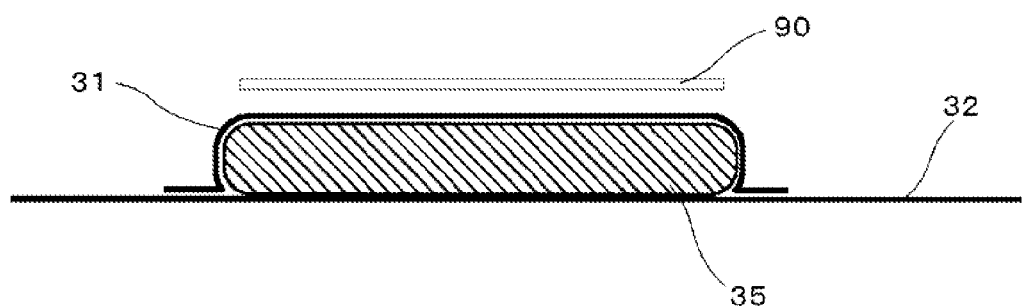
FIGS. 21A and 21B are cross-sectional views showing a battery pack according to a fourth embodiment, which is being produced.
Figure 21B:
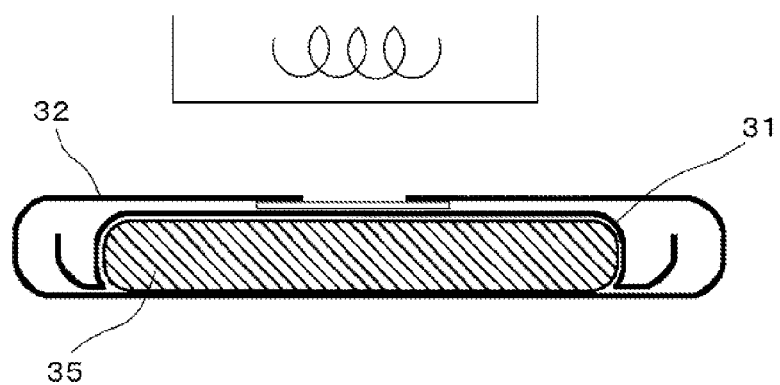

FIGS. 21A and 21B are cross-sectional views showing a battery pack according to still another embodiment, which is in the process of fabrication.

The battery pack according to the present embodiment has a structure similar to that of the battery pack according to the third embodiment, but the flexible laminated film 31 has both sides shorter than those in the third embodiment (FIG. 21A).

As in the case of the third embodiment, the laminated films around the battery element 35 are sealed, and then, as shown in FIG. 21B, the rigid laminated film 32 and flexible laminated film 31 are shaped so that they cover the battery element 35. In the present embodiment, a heat-bonding resin tape 90 is prepared, and the tape 90 is disposed between the heat-bonding layer of the folded rigid laminated film 32 and the outer covering layer of the flexible laminated film 31 covering the battery element 35 and melted to bond together these films. In this instance, as in the case of the first embodiment, the rigid laminated film and the flexible laminated film are bonded with an adhesive strength equal to or higher than atmospheric pressure and with a peel strength equal to or lower than a breaking strength of the flexible laminated film. For example, the heat-bonding resin tape 90 is melted while the outer covering layer of the flexible laminated film 31 is not melted. The heat-bonding resin tape 90 may have a substrate.

The battery pack according to the present embodiment has excellent effect of the battery pack according to the first embodiment exhibited upon the drop and the like.

In the present embodiment, instead of the heat-bonding resin tape 90, a so-called adhesive double-faced tape can be used, and, in this case, bonding at low temperatures is possible.

Fifth Embodiment

Figure 22A:
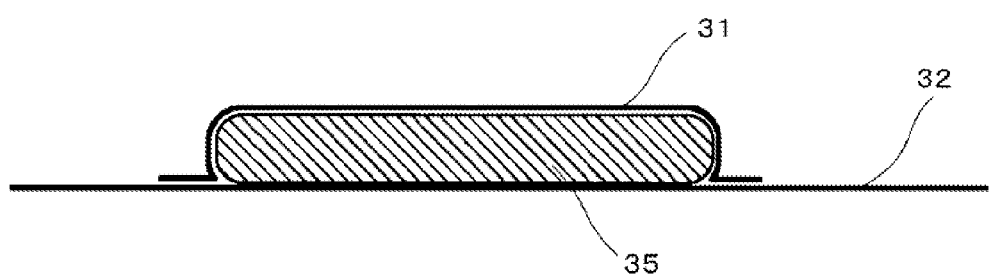
FIGS. 22A and 22B are cross-sectional views showing a battery pack according to a fifth embodiment, which is being produced.
Figure 22B:
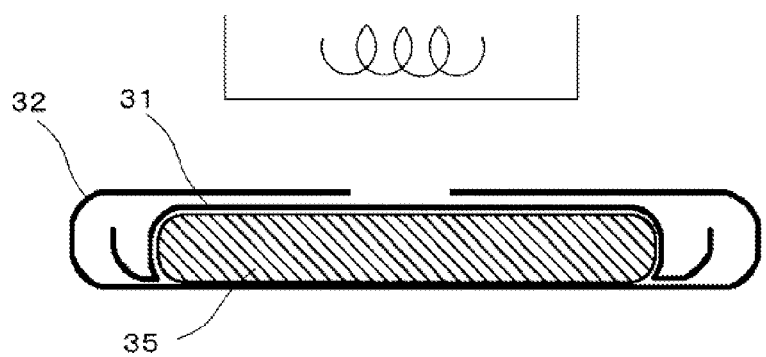

FIGS. 22A and 22B are cross-sectional views showing a battery pack according to still further another embodiment, which is being produced.

The battery pack according to the present embodiment has a structure similar to that of the battery pack according to the third embodiment, but the flexible laminated film 31 has both sides shorter than those in the third embodiment (FIG. 22A).

As in the case of the third embodiment, the laminated films around the battery element 35 are sealed, and then, as shown in FIG. 22B, the rigid laminated film 32 and flexible laminated film 31 are shaped so that they cover the battery element 35, but, in the present embodiment, the heat-bonding layer of the folded rigid laminated film 32 is melted and bonded with the outer covering layer of the flexible laminated film 31 covering the battery element 35. In this instance, as in the case of the first embodiment, the rigid laminated film and the flexible laminated film are bonded with an adhesive strength equal to or higher than atmospheric pressure and with a peel strength equal to or lower than a breaking strength of the flexible laminated film. For example, the heat-bonding layer of the rigid laminated film 32 is melted while the outer covering layer of the flexible laminated film 31 is not melted.

The battery pack according to the present embodiment has excellent effect of the battery pack according to the first embodiment exhibited upon the drop and the like.

In the present embodiment, an acryl ester, silicone, or latex adhesive can be used for bonding the outer covering layer of the folded rigid laminated film 32 and the outer covering layer of the flexible laminated film 31 covering the battery element 35, and, in this case, bonding at low temperatures is possible.

EXAMPLES

Hereinbelow, the present application will be described in more detail with reference to the following Examples and Comparative Examples, which should not be construed as limiting the scope.

Examples 1-1 to 23-5 and Comparative Examples 1 to 4

Battery packs having structures and properties shown in Tables 1 to 4 below were individually prepared by the above-described procedure. With respect to each of the battery packs obtained, evaluations of performance shown below were conducted, and the results are shown in Tables 5 to 8.

(a) Adhesive Strength Test

With respect to each of the Examples and Comparative Examples, an adhesive strength between the flexible covering member and the bonding layer was measured. The measurement was conducted by folding both ends of the pack casing including the bonding layer and stacking them and performing a tensile test in the direction perpendicular to the surface of the battery.

(b) Peel Strength Test

With respect to each of the Examples and Comparative Examples, a peel strength between the flexible covering member and the bonding layer was measured. The measurement was conducted by peeling one end of the pack casing including the bonding layer.

A peel strength was measured in accordance with the method described in JIS K6854-2 (Determination of peel strength of bonded assemblies—Part 2: 180° peel).

(c) Drop Test 1

The battery packs in the Examples and Comparative Examples were individually dropped in an arbitrary position from a height of 1.5 meters ten times, and then checked whether the battery pack was able to be fitted into a portable electric device without any problems and was able to be charged and used without lowering of the functions. It is required that the battery pack have a design such that both the electricity generating elements and the casing are basically not damaged in the drop from that height and the resultant battery pack be subsequently usable as a battery pack.

(d) Drop Test 2

The battery packs in the Examples and Comparative Examples were individually dropped in an arbitrary position from a height of 10 meters, and then checked that the battery pack was unable to be fitted into a portable electric device, the battery element was not damaged, and the battery casing was not damaged.

It is required that the battery have a design such that the battery is not damaged unless air goes into the battery from the outside, the casing is possibly damaged, and the pack housing absorbs the impact/shock to protect the device from the impact/shock.

In this test, a battery pack such that the battery pack was unable to be used and the battery body or battery casing was not damaged passed the test, and a battery pack such that the battery pack had no malfunctions and the battery body or battery casing was damaged did not pass the test.

TABLE 1

| | Adhesive strength MPa | Peel strength N/mm | Outer covering layer of rigid covering member Material | Thickness μm | Thermal conductivity $Wm^{-2}K^{-1}$ | Metal layer of rigid covering member Material | Thickness μm |
|---|---|---|---|---|---|---|---|
| Ex. 1-1 | 0.20 | 2.22 | Polyethylene terephthalate | 12 | 50,000 | Aluminum | 100 |
| Ex. 1-2 | 0.18 | 2.00 | Polybutylene terephthalate | 12 | 50,000 | Aluminum | 100 |
| Ex. 1-3 | 0.16 | 1.8 | Polyethylene naphthalate | 12 | 50,000 | Aluminum | 100 |
| Ex. 1-4 | 0.14 | 1.6 | Oriented nylon 6 | 25 | 8,400 | Aluminum | 100 |
| Ex. 1-5 | 0.15 | 1.7 | Oriented polyethylene | 25 | 13,200 | Aluminum | 100 |
| Ex. 1-6 | 0.12 | 1.3 | Oriented polypropylene | 25 | 4,800 | Aluminum | 100 |
| Ex. 1-7 | 0.39 | 4.3 | None (Only protective layer) | 2 | 500,000 | Aluminum | 100 |
| Ex. 2-1 | 0.20 | 2.2 | Polyethylene terephthalate | 12 | 50,000 | Copper | 100 |
| Ex. 2-2 | 0.20 | 2.2 | Polyethylene terephthalate | 12 | 50,000 | Iron | 100 |
| Ex. 2-3 | 0.20 | 2.2 | Polyethylene terephthalate | 12 | 50,000 | Nickel-plated iron | 100 |
| Ex. 2-4 | 0.20 | 2.2 | Polyethylene terephthalate | 12 | 50,000 | Nickel | 100 |
| Ex. 2-5 | 0.20 | 2.2 | Polyethylene terephthalate | 12 | 50,000 | Tin-plated iron | 100 |
| Ex. 2-6 | 0.20 | 2.2 | Polyethylene terephthalate | 12 | 50,000 | Zinc-plated iron | 100 |
| Ex. 2-7 | 0.20 | 2.2 | Polyethylene terephthalate | 12 | 50,000 | Stainless steel | 100 |
| Ex. 3 | 0.11 | 1.2 | Oriented polypropylene | 115 | 1,043 | Aluminum | 100 |
| Ex. 4 | 0.10 | 1.1 | Oriented polypropylene | 115 | 1,043 | Stainless steel | 330 |
| Ex. 5-1 | 0.18 | 2.0 | Polyethylene terephthalate | 12 | 50,000 | Aluminum | 100 |
| Ex. 5-2 | 0.16 | 1.8 | Polyethylene terephthalate | 12 | 50,000 | Aluminum | 100 |
| Ex. 5-3 | 0.17 | 1.9 | Polyethylene terephthalate | 12 | 50,000 | Aluminum | 100 |
| Ex. 5-4 | 0.16 | 1.8 | Polyethylene terephthalate | 12 | 50,000 | Aluminum | 100 |
| Ex. 5-5 | 0.19 | 2.1 | Polyethylene terephthalate | 12 | 50,000 | Aluminum | 100 |
| Ex. 5-6 | 0.17 | 1.9 | Polyethylene terephthalate | 12 | 50,000 | Aluminum | 100 |
| Ex. 5-7 | 0.16 | 1.8 | Polyethylene terephthalate | 12 | 50,000 | Aluminum | 100 |

TABLE 1-continued

| | | | | | | | |
|---|---|---|---|---|---|---|---|
| Ex. 5-8 | 0.40 | 4.4 | Polyethylene terephthalate | 12 | 50,000 | Aluminum | 100 |
| Ex. 5-9 | 0.16 | 1.8 | Polyethylene terephthalate | 12 | 50,000 | Aluminum | 100 |
| Ex. 5-10 | 0.16 | 1.8 | Polyethylene terephthalate | 12 | 50,000 | Aluminum | 100 |
| Ex. 5-11 | 0.16 | 1.8 | Polyethylene terephthalate | 12 | 50,000 | Aluminum | 100 |
| Ex. 5-12 | 0.45 | 5.4 | Polyethylene terephthalate | 12 | 50,000 | Aluminum | 100 |
| Ex. 6-1 | 0.17 | 1.9 | Polyethylene terephthalate | 12 | 50,000 | Aluminum | 100 |
| Ex. 6-2 | 0.17 | 1.9 | Polyethylene terephthalate | 12 | 50,000 | Aluminum | 100 |
| Ex. 6-3 | 0.17 | 1.9 | Polyethylene terephthalate | 12 | 50,000 | Aluminum | 100 |
| Ex. 6-4 | 0.17 | 1.9 | Polyethylene terephthalate | 12 | 50,000 | Aluminum | 100 |
| Ex. 6-5 | 0.17 | 1.9 | Polyethylene terephthalate | 12 | 50,000 | Aluminum | 100 |
| Com. Ex. 1 | 0.05 | 0.6 | Oriented polypropylene | 150 | 800 | Stainless steel | 400 |
| Com. Ex. 2 | 0.53 | 5.7 | Polyethylene terephthalate | 12 | 50,000 | Aluminum | 100 |
| Com. Ex. 3 | 0.52 | 5.7 | Battery sealed in soft casing is fixed to molded case with adhesive double-faced tape | | | | |
| Com. Ex. 4 | 0.17 | 2.1 | Polyethylene terephthalate | 12 | 50,000 | Aluminum | 100 |

| | Rigid covering member Thermal conductivity $Wm^{-2}K^{-1}$ | Outer covering layer + metal layer Thermal conductivity $Wm^{-2}K^{-1}$ | Bonding layer | Outer covering layer of flexible covering member | Vacuum (Adhesion of casing and device) |
|---|---|---|---|---|---|
| Ex. 1-1 | 2,300,000 | 48,940 | EVA on polypropylene surface | Nylon | Vacuum |
| Ex. 1-2 | 2,300,000 | 48,936 | EVA on polypropylene surface | Nylon | Vacuum |
| Ex. 1-3 | 2,300,000 | 48,936 | EVA on polypropylene surface | Nylon | Vacuum |
| Ex. 1-4 | 2,300,000 | 8,369 | EVA on polypropylene surface | Nylon | Vacuum |
| Ex. 1-5 | 2,300,000 | 13,125 | EVA on polypropylene surface | Nylon | Vacuum |
| Ex. 1-6 | 2,300,000 | 4,790 | EVA on polypropylene surface | Nylon | Vacuum |
| Ex. 1-7 | 2,300,000 | 410,714 | EVA on polypropylene surface | Nylon | Vacuum |
| Ex. 2-1 | 3,900,000 | 49,367 | EVA on polypropylene surface | Nylon | Vacuum |
| Ex. 2-2 | 900,000 | 47,368 | EVA on polypropylene surface | Nylon | Vacuum |
| Ex. 2-3 | 950,000 | 47,500 | EVA on polypropylene surface | Nylon | Vacuum |
| Ex. 2-4 | 1,000,000 | 47,619 | EVA on polypropylene surface | Nylon | Vacuum |

TABLE 1-continued

| | | | | | |
|---|---|---|---|---|---|
| Ex. 2-5 | 850,000 | 47,222 | EVA on polypropylene surface | Nylon | Vacuum |
| Ex. 2-6 | 1,000,000 | 47,619 | EVA on polypropylene surface | Nylon | Vacuum |
| Ex. 2-7 | 150,000 | 37,500 | EVA on polypropylene surface | Nylon | Vacuum |
| Ex. 3 | 2,300,000 | 1,043 | EVA on polypropylene surface | Nylon | Vacuum |
| Ex. 4 | 45,455 | 1,020 | EVA on polypropylene surface | Nylon | Vacuum |
| Ex. 5-1 | 2,300,000 | 48,936 | Ethylene-acrylic acid copolymer | Nylon | Vacuum |
| Ex. 5-2 | 2,300,000 | 48,936 | Ethyl acrylate copolymer | Nylon | Vacuum |
| Ex. 5-3 | 2,300,000 | 48,936 | Methyl acrylate copolymer | Nylon | Vacuum |
| Ex. 5-4 | 2,300,000 | 48,936 | Methacrylic acid copolymer | Nylon | Vacuum |
| Ex. 5-5 | 2,300,000 | 48,936 | Methyl methacrylate copolymer | Nylon | Vacuum |
| Ex. 5-6 | 2,300,000 | 48,936 | Polyacrylonitrile | Nylon | Vacuum |
| Ex. 5-7 | 2,300,000 | 48,936 | Ethylene-vinyl alcohol resin | Nylon | Vacuum |
| Ex. 5-8 | 2,300,000 | 48,936 | Polyamide hot-melt | Nylon | Vacuum |
| Ex. 5-9 | 2,300,000 | 48,936 | Polyester hot-melt | Nylon | Vacuum |
| Ex. 5-10 | 2,300,000 | 48,936 | Acid-modified polypropylene | Nylon | Vacuum |
| Ex. 5-11 | 2,300,000 | 48,936 | Ionomer | Nylon | Vacuum |
| Ex. 5-12 | 2,300,001 | 48,936 | Adhesive double-faced tape | Nylon | Vacuum |
| Ex. 6-1 | 2,300,000 | 48,936 | EVA on polypropylene surface | Polyethylene terephthalate | Vacuum |
| Ex. 6-2 | 2,300,000 | 48,936 | EVA on polypropylene surface | Polybutylene terephthalate | Vacuum |
| Ex. 6-3 | 2,300,000 | 48,936 | EVA on polypropylene surface | Polyethylene naphthalate | Vacuum |
| Ex. 6-4 | 2,300,000 | 48,936 | EVA on polypropylene surface | Oriented polypropylene | Vacuum |
| Ex. 6-5 | 2,300,000 | 48,936 | EVA on polypropylene surface | Oriented polyethylene | Vacuum |
| Com. Ex. 1 | 37,500 | 783 | EVA on polypropylene surface | Nylon | Vacuum |
| Com. Ex. 2 | 2,300,000 | 48,940 | Polyamide hot-melt | Heated until nylon is melted | Vacuum |
| Com. Ex. 3 | | — | High-strength adhesive double-faced tape | Nylon | Vacuum |
| Com. Ex. 4 | 2,300,000 | 48,940 | EVA on polypropylene surface | Nylon | No vacuum |

(EVA: ethylene-vinyl acetate copolymer)

TABLE 2

| | Adhesive strength MPa | Peel strength N/mm | Resins in composite layer Outer covering layer (hard)/Bonding layer/ Outer covering layer (soft) Material and thickness/μm | Total thickness μm | Thermal conductivity Wm$^{-2}$K$^{-1}$ | Metal in composite layer Material | Thickness μm |
|---|---|---|---|---|---|---|---|
| Ex. 7-1 | 0.12 | 1.3 | Polyethylene terephthalate 12/ Cast polypropylene 60/Nylon 15 | 87 | 1,690 | Aluminum | 135 |
| Ex. 7-2 | 0.12 | 1.3 | Polybutylene terephthalate 12/ Cast polypropylene 60/Nylon 15 | 87 | 1,690 | Aluminum | 135 |
| Ex. 7-3 | 0.12 | 1.3 | Polyethylene naphthalate 12/ Cast polypropylene 60/Nylon 15 | 87 | 1,690 | Aluminum | 135 |
| Ex. 7-4 | 0.12 | 1.3 | Nylon 15/Cast polypropylene 60/Nylon 15 | 90 | 1,556 | Aluminum | 135 |
| Ex. 7-5 | 0.12 | 1.3 | Oriented polyethylene 25/ Cast polypropylene 60/Nylon 15 | 100 | 1,545 | Aluminum | 135 |
| Ex. 7-6 | 0.11 | 1.2 | Oriented polypropylene 25/ Cast polypropylene 60/Nylon 15 | 100 | 1,282 | Aluminum | 135 |
| Ex. 8-1 | 0.11 | 1.6 | Polyethylene terephthalate 12/ Cast polypropylene 60/Nylon 15 | 87 | 1,690 | Copper | 135 |
| Ex. 8-2 | 0.11 | 1.2 | Polyethylene terephthalate 12/ Cast polypropylene 60/Nylon 15 | 87 | 1,690 | Iron | 135 |
| Ex. 8-3 | 0.11 | 1.2 | Polyethylene terephthalate 12/ Cast polypropylene 60/Nylon 15 | 87 | 1,690 | Nickel-plated iron | 135 |
| Ex. 8-4 | 0.11 | 1.2 | Polyethylene terephthalate 12/ Cast polypropylene 60/Nylon 15 | 87 | 1,690 | Nickel | 135 |
| Ex. 8-5 | 0.11 | 1.2 | Polyethylene terephthalate 12/ Cast polypropylene 60/Nylon 15 | 87 | 1,690 | Tin-plated iron | 135 |
| Ex. 8-6 | 0.11 | 1.2 | Polyethylene terephthalate 12/ Cast polypropylene 60/Nylon 15 | 87 | 1,690 | Zinc-plated iron | 135 |
| Ex. 8-7 | 0.11 | 1.2 | Polyethylene terephthalate 12/ Cast polypropylene 60/Nylon 15 | 87 | 1,690 | Stainless steel | 135 |
| Ex. 9 | 0.10 | 1.1 | Polyethylene terephthalate 12/ Cast polypropylene 60/Nylon 15 | 87 | 1,690 | Aluminum | 335 |
| Ex. 10-1 | 0.12 | 1.3 | Polyethylene terephthalate 12/ Cast polypropylene 60/Nylon 15 | 87 | 1,690 | Aluminum | 135 |
| Ex. 10-2 | 0.12 | 1.3 | Polyethylene terephthalate 12/ Cast polypropylene 60/Nylon 15 | 87 | 1,690 | Aluminum | 135 |
| Ex. 10-3 | 0.12 | 1.3 | Polyethylene terephthalate 12/ Cast polypropylene 60/Nylon 15 | 87 | 1,690 | Aluminum | 135 |
| Ex. 10-4 | 0.12 | 1.3 | Polyethylene terephthalate 12/ Cast polypropylene 60/Nylon 15 | 87 | 1,690 | Aluminum | 135 |

TABLE 2-continued

| | | | | | | | | |
|---|---|---|---|---|---|---|---|---|
| Ex. 10-5 | 0.12 | 1.3 | Polyethylene terephthalate 12/ Cast polypropylene 60/Nylon 15 | | 87 | 1,690 | Aluminum | 135 |
| Ex. 10-6 | 0.12 | 1.3 | Polyethylene terephthalate 12/ Cast polypropylene 60/Nylon 15 | | 87 | 1,690 | Aluminum | 135 |
| Ex. 10-7 | 0.12 | 1.3 | Polyethylene terephthalate 12/ Cast polypropylene 60/Nylon 15 | | 87 | 1,690 | Aluminum | 135 |
| Ex. 10-8 | 0.40 | 4.4 | Polyethylene terephthalate 12/ Cast polypropylene 60/Nylon 15 | | 87 | 1,690 | Aluminum | 135 |
| Ex. 10-9 | 0.12 | 1.3 | Polyethylene terephthalate 12/ Cast polypropylene 60/Nylon 15 | | 87 | 1,690 | Aluminum | 135 |
| Ex. 10-10 | 0.12 | 1.3 | Polyethylene terephthalate 12/ Cast polypropylene 60/Nylon 15 | | 87 | 1,690 | Aluminum | 135 |
| Ex. 10-11 | 0.12 | 1.3 | Polyethylene terephthalate 12/ Cast polypropylene 60/Nylon 15 | | 87 | 1,690 | Aluminum | 135 |
| Ex. 10-12 | 0.45 | 5.0 | Polyethylene terephthalate 12/ Cast polypropylene 60/Nylon 15 | | 87 | 1,690 | Aluminum | 135 |
| Ex. 11-1 | 0.12 | 1.3 | Polyethylene terephthalate 12/ Cast polypropylene 60/Nylon 15 | | 87 | 1,690 | Aluminum | 135 |
| Ex. 11-2 | 0.12 | 1.3 | Polyethylene terephthalate 12/ Cast polypropylene 60/Nylon 15 | | 87 | 1,690 | Aluminum | 135 |
| Ex. 11-3 | 0.12 | 1.3 | Polyethylene terephthalate 12/ Cast polypropylene 60/Nylon 15 | | 87 | 1,690 | Aluminum | 135 |
| Ex. 11-4 | 0.12 | 1.3 | Polyethylene terephthalate 12/ Cast polypropylene 60/Nylon 15 | | 87 | 1,690 | Aluminum | 135 |
| Ex. 11-5 | 0.12 | 1.3 | Polyethylene terephthalate 12/ Cast polypropylene 60/Nylon 15 | | 87 | 1,690 | Aluminum | 135 |

| | Thermal conductivity $Wm^{-2}K^{-1}$ | Whole composite layer Thermal conductivity $Wm^{-2}K^{-1}$ | Adhesive tape | Outer covering layer of flexible covering member | Vacuum |
|---|---|---|---|---|---|
| Ex. 7-1 | 1,703,704 | 1,688 | EVA on polyethylene surface | Nylon | Vacuum |
| Ex. 7-2 | 1,703,704 | 1,688 | EVA on polyethylene surface | Nylon | Vacuum |
| Ex. 7-3 | 1,703,704 | 1,688 | EVA on polyethylene surface | Nylon | Vacuum |
| Ex. 7-4 | 1,703,704 | 1,555 | EVA on polyethylene surface | Nylon | Vacuum |
| Ex. 7-5 | 1,703,704 | 1,544 | EVA on polyethylene surface | Nylon | Vacuum |
| Ex. 7-6 | 1,703,704 | 1,281 | EVA on polyethylene surface | Nylon | Vacuum |

TABLE 2-continued

| | | | | | |
|---|---|---|---|---|---|
| Ex. 8-1 | 2,888,889 | 1,689 | EVA on polyethylene surface | Nylon | Vacuum |
| Ex. 8-2 | 666,667 | 1,686 | EVA on polyethylene surface | Nylon | Vacuum |
| Ex. 8-3 | 666,667 | 1,686 | EVA on polyethylene surface | Nylon | Vacuum |
| Ex. 8-4 | 740,741 | 1,686 | EVA on polyethylene surface | Nylon | Vacuum |
| Ex. 8-5 | 629,630 | 1,685 | EVA on polyethylene surface | Nylon | Vacuum |
| Ex. 8-6 | 740,741 | 1,686 | EVA on polyethylene surface | Nylon | Vacuum |
| Ex. 8-7 | 111,111 | 1,665 | EVA on polyethylene surface | Nylon | Vacuum |
| Ex. 9 | 686,567 | 1,686 | EVA on polyethylene surface | Nylon | Vacuum |
| Ex. 10-1 | 1,703,704 | 1,688 | Ethylene-acrylic acid copolymer | Nylon | Vacuum |
| Ex. 10-2 | 1,703,704 | 1,688 | Ethyl acrylate copolymer | Nylon | Vacuum |
| Ex. 10-3 | 1,703,704 | 1,688 | Methyl acrylate copolymer | Nylon | Vacuum |
| Ex. 10-4 | 1,703,704 | 1,688 | Methacrylic acid copolymer | Nylon | Vacuum |
| Ex. 10-5 | 1,703,704 | 1,688 | Methyl methacrylate copolymer | Nylon | Vacuum |
| Ex. 10-6 | 1,703,704 | 1,688 | Polyacrylonitrile | Nylon | Vacuum |
| Ex. 10-7 | 1,703,704 | 1,688 | Ethylene-vinyl alcohol resin | Nylon | Vacuum |
| Ex. 10-8 | 1,703,704 | 1,688 | Polyamide hot-melt | Nylon | Vacuum |
| Ex. 10-9 | 1,703,704 | 1,688 | Polyester hot-melt | Nylon | Vacuum |
| Ex. 10-10 | 1,703,704 | 1,688 | Acid-modified polypropylene | Nylon | Vacuum |
| Ex. 10-11 | 1,703,704 | 1,688 | Ionomer | Nylon | Vacuum |
| Ex. 10-12 | 1,703,704 | 1,688 | Adhesive double-faced tape | Nylon | Vacuum |
| Ex. 11-1 | 1,703,704 | 1,688 | EVA on polyethylene surface | Polyethylene terephthalate | Vacuum |
| Ex. 11-2 | 1,703,704 | 1,688 | EVA on polyethylene surface | Polybutylene terephthalate | Vacuum |
| Ex. 11-3 | 1,703,704 | 1,688 | EVA on polyethylene surface | Polyethylene naphthalate | Vacuum |
| Ex. 11-4 | 1,703,704 | 1,688 | EVA on polyethylene surface | Oriented polypropylene | Vacuum |
| Ex. 11-5 | 1,703,704 | 1,688 | EVA on polyethylene surface | Oriented polyethylene | Vacuum |

(EVA: ethylene-vinyl acetate copolymer)

TABLE 3

| | Adhesive strength MPa | Peel strength N/nm | Outer covering layer of rigid covering member Material | Thickness μm | Thermal conductivity $Wm^{-2}K^{-1}$ | Metal layer of rigid covering member Material | Thickness μm |
|---|---|---|---|---|---|---|---|
| Ex. 12-1 | 0.19 | 2.1 | Polyethylene terephthalate | 12 | 50,000 | Aluminum | 100 |
| Ex. 12-2 | 0.17 | 1.9 | Polybutylene terephthalate | 12 | 50,000 | Aluminum | 100 |
| Ex. 12-3 | 0.15 | 1.7 | Polyethylene naphthalate | 12 | 50,000 | Aluminum | 100 |
| Ex. 12-4 | 0.13 | 1.4 | Oriented nylon 6 | 25 | 8,400 | Aluminum | 100 |
| Ex. 12-5 | 0.14 | 1.6 | Oriented polyethylene | 25 | 13,200 | Aluminum | 100 |
| Ex. 12-6 | 0.11 | 1.2 | Oriented polypropylene | 25 | 4,800 | Aluminum | 100 |
| Ex. 12-7 | 0.38 | 4.2 | None (Only protective layer) | 2 | 500,000 | Aluminum | 100 |
| Ex. 13-1 | 0.19 | 2.1 | Polyethylene terephthalate | 12 | 50,000 | Copper | 100 |
| Ex. 13-2 | 0.19 | 2.1 | Polyethylene terephthalate | 12 | 50,000 | Iron | 100 |
| Ex. 13-3 | 0.19 | 2.1 | Polyethylene terephthalate | 12 | 50,000 | Nickel-plated iron | 100 |
| Ex. 13-4 | 0.19 | 2.1 | Polyethylene terephthalate | 12 | 50,000 | Nickel | 100 |
| Ex. 13-5 | 0.19 | 2.1 | Polyethylene terephthalate | 12 | 50,000 | Tin-plated iron | 100 |
| Ex. 13-6 | 0.19 | 2.1 | Polyethylene terephthalate | 12 | 50,000 | Zinc-plated iron | 100 |
| Ex. 13-7 | 0.19 | 2.1 | Polyethylene terephthalate | 12 | 50,000 | Stainless steel | 100 |
| Ex. 14 | 0.10 | 1.1 | Oriented polypropylene | 115 | 1,043 | Aluminum | 100 |
| Ex. 15 | 0.09 | 1.0 | Oriented polypropylene | 115 | 1,043 | Aluminum | 330 |
| Ex. 16-1 | 0.17 | 1.9 | Polyethylene terephthalate | 12 | 50,000 | Aluminum | 100 |
| Ex. 16-2 | 0.15 | 1.7 | Polyethylene terephthalate | 12 | 50,000 | Aluminum | 100 |
| Ex. 16-3 | 0.16 | 1.8 | Polyethylene terephthalate | 12 | 50,000 | Aluminum | 100 |
| Ex. 16-4 | 0.15 | 1.7 | Polyethylene terephthalate | 12 | 50,000 | Aluminum | 100 |
| Ex. 16-5 | 0.18 | 2.0 | Polyethylene terephthalate | 12 | 50,000 | Aluminum | 100 |
| Ex. 16-6 | 0.16 | 1.8 | Polyethylene terephthalate | 12 | 50,000 | Aluminum | 100 |
| Ex. 16-7 | 0.15 | 1.7 | Polyethylene terephthalate | 12 | 50,000 | Aluminum | 100 |
| Ex. 16-8 | 0.39 | 4.3 | Polyethylene terephthalate | 12 | 50,000 | Aluminum | 100 |
| Ex. 16-9 | 0.15 | 1.7 | Polyethylene terephthalate | 12 | 50,000 | Aluminum | 100 |
| Ex. 16-10 | 0.15 | 1.7 | Polyethylene terephthalate | 12 | 50,000 | Aluminum | 100 |
| Ex. 16-11 | 0.15 | 1.7 | Polyethylene terephthalate | 12 | 50,000 | Aluminum | 100 |
| Ex. 16-12 | 0.44 | 4.9 | Polyethylene terephthalate | 12 | 50,000 | Aluminum | 100 |
| Ex. 17-1 | 0.16 | 1.8 | Polyethylene terephthalate | 12 | 50,000 | Aluminum | 100 |
| Ex. 17-2 | 0.16 | 1.8 | Polyethylene terephthalate | 12 | 50,000 | Aluminum | 100 |
| Ex. 17-3 | 0.16 | 1.8 | Polyethylene terephthalate | 12 | 50,000 | Aluminum | 100 |
| Ex. 17-4 | 0.16 | 1.8 | Polyethylene terephthalate | 12 | 50,000 | Aluminum | 100 |
| Ex. 17-5 | 0.16 | 1.8 | Polyethylene terephthalate | 12 | 50,000 | Aluminum | 100 |

TABLE 3-continued

| | Thermal conductivity Wm$^{-2}$K$^{-1}$ | Rigid covering member Outer covering layer + metal layer Thermal conductivity Wm$^{-2}$K$^{-1}$ | Adhesive tape | Outer covering layer of flexible covering member | Vacuum |
|---|---|---|---|---|---|
| Ex. 12-1 | 2,300,000 | 48,940 | EVA on polypropylene surface | Nylon | Vacuum |
| Ex. 12-2 | 2,300,000 | 48,936 | EVA on polypropylene surface | Nylon | Vacuum |
| Ex. 12-3 | 2,300,000 | 48,936 | EVA on polypropylene surface | Nylon | Vacuum |
| Ex. 12-4 | 2,300,000 | 8,369 | EVA on polypropylene surface | Nylon | Vacuum |
| Ex. 12-5 | 2,300,000 | 13,125 | EVA on polypropylene surface | Nylon | Vacuum |
| Ex. 12-6 | 2,300,000 | 4,790 | EVA on polypropylene surface | Nylon | Vacuum |
| Ex. 12-7 | 2,300,000 | 410,714 | EVA on polypropylene surface | Nylon | Vacuum |
| Ex. 13-1 | 3,900,000 | 49,367 | EVA on polypropylene surface | Nylon | Vacuum |
| Ex. 13-2 | 900,000 | 47,368 | EVA on polypropylene surface | Nylon | Vacuum |
| Ex. 13-3 | 950,000 | 47,500 | EVA on polypropylene surface | Nylon | Vacuum |
| Ex. 13-4 | 1,000,000 | 47,619 | EVA on polypropylene surface | Nylon | Vacuum |
| Ex. 13-5 | 850,000 | 47,222 | EVA on polypropylene surface | Nylon | Vacuum |
| Ex. 13-6 | 1,000,000 | 47,619 | EVA on polypropylene surface | Nylon | Vacuum |
| Ex. 13-7 | 150,000 | 37,500 | EVA on polypropylene surface | Nylon | Vacuum |
| Ex. 14 | 2,300,000 | 1,043 | EVA on polypropylene surface | Nylon | Vacuum |
| Ex. 15 | 696,970 | 1,042 | EVA on polypropylene surface | Nylon | Vacuum |
| Ex. 16-1 | 2,300,000 | 48,936 | Ethylene-acrylic acid copolymer | Nylon | Vacuum |
| Ex. 16-2 | 2,300,000 | 48,936 | Ethyl acrylate copolymer | Nylon | Vacuum |
| Ex. 16-3 | 2,300,000 | 48,936 | Methyl acrylate copolymer | Nylon | Vacuum |
| Ex. 16-4 | 2,300,000 | 48,936 | Methacrylic acid copolymer | Nylon | Vacuum |
| Ex. 16-5 | 2,300,000 | 48,936 | Methyl methacrylate copolymer | Nylon | Vacuum |
| Ex. 16-6 | 2,300,000 | 48,936 | Polyacrylonitrile | Nylon | Vacuum |
| Ex. 16-7 | 2,300,000 | 48,936 | Ethylene-vinyl alcohol resin | Nylon | Vacuum |
| Ex. 16-8 | 2,300,000 | 48,936 | Polyamide hot-melt | Nylon | Vacuum |
| Ex. 16-9 | 2,300,000 | 48,936 | Polyester hot-melt | Nylon | Vacuum |

TABLE 3-continued

| | | | | | | |
|---|---|---|---|---|---|---|
| Ex. 16-10 | | 2,300,000 | 48,936 | Acid-modified polypropylene | Nylon | Vacuum |
| Ex. 16-11 | | 2,300,000 | 48,936 | Ionomer | Nylon | Vacuum |
| Ex. 16-12 | | 2,300,001 | 48,936 | Adhesive double-faced tape | Nylon | Vacuum |
| Ex. 17-1 | | 2,300,000 | 48,936 | EVA on polypropylene surface | Polyethylene terephthalate | Vacuum |
| Ex. 17-2 | | 2,300,000 | 48,936 | EVA on polypropylene surface | Polybutylene terephthalate | Vacuum |
| Ex. 17-3 | | 2,300,000 | 48,936 | EVA on polypropylene surface | Polyethylene naphthalate | Vacuum |
| Ex. 17-4 | | 2,300,000 | 48,936 | EVA on polypropylene surface | Oriented polypropylene | Vacuum |
| Ex. 17-5 | | 2,300,000 | 48,936 | EVA on polypropylene surface | Oriented polyethylene | Vacuum |

(EVA: ethylene-vinyl acetate copolymer)
EVA or adhesive double-faced tape is disposed only at a portion opposite the flexible covering material surface.

TABLE 4

| | Adhesive strength MPa | Peel strength N/nm | Outer covering layer of rigid covering member Material | Thickness μm | Thermal conductivity $Wm^{-2}K^{-1}$ | Metal layer of rigid covering member Material | Thickness μm |
|---|---|---|---|---|---|---|---|
| Ex. 18-1 | 0.20 | 2.2 | Polyethylene terephthalate | 12 | 50,000 | Aluminum | 100 |
| Ex. 18-2 | 0.18 | 2.0 | Polybutylene terephthalate | 12 | 50,000 | Aluminum | 100 |
| Ex. 18-3 | 0.16 | 1.8 | Polyethylene naphthalate | 12 | 50,000 | Aluminum | 100 |
| Ex. 18-4 | 0.14 | 1.6 | Oriented nylon 6 | 25 | 8,400 | Aluminum | 100 |
| Ex. 18-5 | 0.15 | 1.7 | Oriented polyethylene | 25 | 13,200 | Aluminum | 100 |
| Ex. 18-6 | 0.12 | 1.3 | Oriented polypropylene | 25 | 4,800 | Aluminum | 100 |
| Ex. 18-7 | 0.39 | 4.3 | None (Only protective layer) | 2 | 500,000 | Aluminum | 100 |
| Ex. 19-1 | 0.20 | 2.2 | Polyethylene terephthalate | 12 | 50,000 | Copper | 100 |
| Ex. 19-2 | 0.20 | 2.2 | Polyethylene terephthalate | 12 | 50,000 | Iron | 100 |
| Ex. 19-3 | 0.20 | 2.2 | Polyethylene terephthalate | 12 | 50,000 | Nickel-plated iron | 100 |
| Ex. 19-4 | 0.20 | 2.2 | Polyethylene terephthalate | 12 | 50,000 | Nickel | 100 |
| Ex. 19-5 | 0.20 | 2.2 | Polyethylene terephthalate | 12 | 50,000 | Tin-plated iron | 100 |
| Ex. 19-6 | 0.20 | 2.2 | Polyethylene terephthalate | 12 | 50,000 | Zinc-plated iron | 100 |
| Ex. 19-7 | 0.20 | 2.2 | Polyethylene terephthalate | 12 | 50,000 | Stainless steel | 100 |
| Ex. 20 | 0.11 | 1.2 | Oriented polypropylene | 115 | 1,043 | Aluminum | 100 |
| Ex. 21 | 0.10 | 1.1 | Oriented polypropylene | 115 | 1,043 | Aluminum | 330 |
| Ex. 22-1 | 0.18 | 2.0 | Polyethylene terephthalate | 12 | 50,000 | Aluminum | 100 |
| Ex. 22-2 | 0.16 | 1.8 | Polyethylene terephthalate | 12 | 50,000 | Aluminum | 100 |
| Ex. 22-3 | 0.17 | 1.9 | Polyethylene terephthalate | 12 | 50,000 | Aluminum | 100 |
| Ex. 22-4 | 0.16 | 1.8 | Polyethylene terephthalate | 12 | 50,000 | Aluminum | 100 |
| Ex. 22-5 | 0.19 | 2.1 | Polyethylene terephthalate | 12 | 50,000 | Aluminum | 100 |

TABLE 4-continued

| | | | | | | | | |
|---|---|---|---|---|---|---|---|---|
| Ex. 22-6 | 0.17 | 1.9 | Polyethylene terephthalate | 12 | 50,000 | Aluminum | 100 | |
| Ex. 22-7 | 0.16 | 1.8 | Polyethylene terephthalate | 12 | 50,000 | Aluminum | 100 | |
| Ex. 22-8 | 0.40 | 4.4 | Polyethylene terephthalate | 12 | 50,000 | Aluminum | 100 | |
| Ex. 22-9 | 0.16 | 1.8 | Polyethylene terephthalate | 12 | 50,000 | Aluminum | 100 | |
| Ex. 22-10 | 0.16 | 1.8 | Polyethylene terephthalate | 12 | 50,000 | Aluminum | 100 | |
| Ex. 22-11 | 0.16 | 1.8 | Polyethylene terephthalate | 12 | 50,000 | Aluminum | 100 | |
| Ex. 22-12 | 0.45 | 5.6 | Polyethylene terephthalate | 12 | 50,000 | Aluminum | 100 | |
| Ex. 23-1 | 0.17 | 1.9 | Polyethylene terephthalate | 12 | 50,000 | Aluminum | 100 | |
| Ex. 23-2 | 0.17 | 1.9 | Polyethylene terephthalate | 12 | 50,000 | Aluminum | 100 | |
| Ex. 23-3 | 0.17 | 1.9 | Polyethylene terephthalate | 12 | 50,000 | Aluminum | 100 | |
| Ex. 23-4 | 0.17 | 1.9 | Polyethylene terephthalate | 12 | 50,000 | Aluminum | 100 | |
| Ex. 23-5 | 0.17 | 1.9 | Polyethylene terephthalate | 12 | 50,000 | Aluminum | 100 | |

| | Rigid covering member Thermal conductivity Wm$^{-2}$K$^{-1}$ | Outer covering layer + metal layer Thermal conductivity Wm$^{-2}$K$^{-1}$ | Bonding layer | Outer covering layer of flexible covering member | Vacuum |
|---|---|---|---|---|---|
| Ex. 18-1 | 2,300,000 | 48,940 | EVA on polypropylene surface | Nylon | Vacuum |
| Ex. 18-2 | 2,300,000 | 48,936 | EVA on polypropylene surface | Nylon | Vacuum |
| Ex. 18-3 | 2,300,000 | 48,936 | EVA on polypropylene surface | Nylon | Vacuum |
| Ex. 18-4 | 2,300,000 | 8,369 | EVA on polypropylene surface | Nylon | Vacuum |
| Ex. 18-5 | 2,300,000 | 13,125 | EVA on polypropylene surface | Nylon | Vacuum |
| Ex. 18-6 | 2,300,000 | 4,790 | EVA on polypropylene surface | Nylon | Vacuum |
| Ex. 18-7 | 2,300,000 | 410,714 | EVA on polypropylene surface | Nylon | Vacuum |
| Ex. 19-1 | 3,900,000 | 49,367 | EVA on polypropylene surface | Nylon | Vacuum |
| Ex. 19-2 | 900,000 | 47,368 | EVA on polypropylene surface | Nylon | Vacuum |
| Ex. 19-3 | 950,000 | 47,500 | EVA on polypropylene surface | Nylon | Vacuum |
| Ex. 19-4 | 1,000,000 | 47,619 | EVA on polypropylene surface | Nylon | Vacuum |
| Ex. 19-5 | 850,000 | 47,222 | EVA on polypropylene surface | Nylon | Vacuum |
| Ex. 19-6 | 1,000,000 | 47,619 | EVA on polypropylene surface | Nylon | Vacuum |
| Ex. 19-7 | 150,000 | 37,500 | EVA on polypropylene surface | Nylon | Vacuum |
| Ex. 20 | 2,300,000 | 1,043 | EVA on polypropylene | Nylon | Vacuum |

TABLE 4-continued

| | | | | | |
|---|---|---|---|---|---|
| Ex. 21 | 696,970 | 1,042 | EVA on polypropylene surface | Nylon | Vacuum |
| Ex. 22-1 | 2,300,000 | 48,936 | Ethylene-acrylic acid copolymer | Nylon | Vacuum |
| Ex. 22-2 | 2,300,000 | 48,936 | Ethyl acrylate copolymer | Nylon | Vacuum |
| Ex. 22-3 | 2,300,000 | 48,936 | Methyl acrylate copolymer | Nylon | Vacuum |
| Ex. 22-4 | 2,300,000 | 48,936 | Methacrylic acid copolymer | Nylon | Vacuum |
| Ex. 22-5 | 2,300,000 | 48,936 | Methyl methacrylate copolymer | Nylon | Vacuum |
| Ex. 22-6 | 2,300,000 | 48,936 | Polyacrylonitrile | Nylon | Vacuum |
| Ex. 22-7 | 2,300,000 | 48,936 | Ethylene-vinyl alcohol resin | Nylon | Vacuum |
| Ex. 22-8 | 2,300,000 | 48,936 | Polyamide hot-melt | Nylon | Vacuum |
| Ex. 22-9 | 2,300,000 | 48,936 | Polyester hot-melt | Nylon | Vacuum |
| Ex. 22-10 | 2,300,000 | 48,936 | Acid-modified polypropylene | Nylon | Vacuum |
| Ex. 22-11 | 2,300,000 | 48,936 | Ionomer | Nylon | Vacuum |
| Ex. 22-12 | 2,300,001 | 48,936 | Adhesive on polypropylene surface | Nylon | Vacuum |
| Ex. 23-1 | 2,300,000 | 48,936 | EVA on polypropylene surface | Polyethylene terephthalate | Vacuum |
| Ex. 23-2 | 2,300,000 | 48,936 | EVA on polypropylene surface | Polybutylene terephthalate | Vacuum |
| Ex. 23-3 | 2,300,000 | 48,936 | EVA on polypropylene surface | Polyethylene naphthalate | Vacuum |
| Ex. 23-4 | 2,300,000 | 48,936 | EVA on polypropylene surface | Oriented polypropylene | Vacuum |
| Ex. 23-5 | 2,300,000 | 48,936 | EVA on polypropylene surface | Oriented polyethylene | Vacuum |

(EVA: ethylene-vinyl acetate copolymer)
EVA or adhesive is disposed only at a portion opposite the flexible covering member surface.

TABLE 5

| | Usable or not without damage after 1.5 m drop test | Damage of battery casing and pack after 10 m drop test |
|---|---|---|
| Example 1-1 | OK | Battery casing: No damage<br>Battery pack: Unusable |
| Example 1-2 | OK | Battery casing: No damage<br>Battery pack: Unusable |
| Example 1-3 | OK | Battery casing: No damage<br>Battery pack: Unusable |
| Example 1-4 | OK | Battery casing: No damage<br>Battery pack: Unusable |
| Example 1-5 | OK | Battery casing: No damage<br>Battery pack: Unusable |
| Example 1-6 | OK | Battery casing: No damage<br>Battery pack: Unusable |
| Example 1-7 | OK | Battery casing: No damage<br>Battery pack: Unusable |
| Example 2-1 | OK | Battery casing: No damage<br>Battery pack: Unusable |
| Example 2-2 | OK | Battery casing: No damage<br>Battery pack: Unusable |
| Example 2-3 | OK | Battery casing: No damage<br>Battery pack: Unusable |
| Example 2-4 | OK | Battery casing: No damage<br>Battery pack: Unusable |
| Example 2-5 | OK | Battery casing: No damage<br>Battery pack: Unusable |
| Example 2-6 | OK | Battery casing: No damage<br>Battery pack: Unusable |
| Example 2-7 | OK | Battery casing: No damage<br>Battery pack: Unusable |
| Example 3 | OK | Battery casing: No damage<br>Battery pack: Unusable |
| Example 4 | OK | Battery casing: No damage<br>Battery pack: Unusable |
| Example 5-1 | OK | Battery casing: No damage<br>Battery pack: Unusable |
| Example 5-2 | OK | Battery casing: No damage<br>Battery pack: Unusable |
| Example 5-3 | OK | Battery casing: No damage<br>Battery pack: Unusable |
| Example 5-4 | OK | Battery casing: No damage<br>Battery pack: Unusable |
| Example 5-5 | OK | Battery casing: No damage<br>Battery pack: Unusable |
| Example 5-6 | OK | Battery casing: No damage<br>Battery pack: Unusable |

TABLE 5-continued

| | Usable or not without damage after 1.5 m drop test | Damage of battery casing and pack after 10 m drop test |
|---|---|---|
| Example 5-7 | OK | Battery casing: No damage<br>Battery pack: Unusable |
| Example 5-8 | OK | Battery casing: No damage<br>Battery pack: Unusable |
| Example 5-9 | OK | Battery casing: No damage<br>Battery pack: Unusable |
| Example 5-10 | OK | Battery casing: No damage<br>Battery pack: Unusable |
| Example 5-11 | OK | Battery casing: No damage<br>Battery pack: Unusable |
| Example 5-12 | OK | Battery casing: No damage<br>Battery pack: Unusable |
| Example 6-1 | OK | Battery casing: No damage<br>Battery pack: Unusable |
| Example 6-2 | OK | Battery casing: No damage<br>Battery pack: Unusable |
| Example 6-3 | OK | Battery casing: No damage<br>Battery pack: Unusable |
| Example 6-4 | OK | Battery casing: No damage<br>Battery pack: Unusable |
| Example 6-5 | OK | Battery casing: No damage<br>Battery pack: Unusable |
| Comparative Example 1 | Unusable due to deformation | Battery casing: No damage<br>Battery pack: Unusable |
| Comparative Example 2 | OK | Battery casing: Damaged<br>Battery pack: Usable |
| Comparative Example 3 | OK | Battery casing: Damaged<br>Battery pack: Usable |
| Comparative Example 4 | Unusable due to deformation | Battery casing: Damaged<br>Battery pack: Usable |

TABLE 6

| | Usable or not without damage after 1.5 m drop test | Damage of battery casing and pack after 10 m drop test |
|---|---|---|
| Example 7-1 | OK | Battery casing: No damage<br>Battery pack: Unusable |
| Example 7-2 | OK | Battery casing: No damage<br>Battery pack: Unusable |
| Example 7-3 | OK | Battery casing: No damage<br>Battery pack: Unusable |
| Example 7-4 | OK | Battery casing: No damage<br>Battery pack: Unusable |
| Example 7-5 | OK | Battery casing: No damage<br>Battery pack: Unusable |
| Example 7-6 | OK | Battery casing: No damage<br>Battery pack: Unusable |
| Example 8-1 | OK | Battery casing: No damage<br>Battery pack: Unusable |
| Example 8-2 | OK | Battery casing: No damage<br>Battery pack: Unusable |
| Example 8-3 | OK | Battery casing: No damage<br>Battery pack: Unusable |
| Example 8-4 | OK | Battery casing: No damage<br>Battery pack: Unusable |
| Example 8-5 | OK | Battery casing: No damage<br>Battery pack: Unusable |
| Example 8-6 | OK | Battery casing: No damage<br>Battery pack: Unusable |
| Example 8-7 | OK | Battery casing: No damage<br>Battery pack: Unusable |
| Example 9 | OK | Battery casing: No damage<br>Battery pack: Unusable |
| Example 10-1 | OK | Battery casing: No damage<br>Battery pack: Unusable |
| Example 10-2 | OK | Battery casing: No damage<br>Battery pack: Unusable |
| Example 10-3 | OK | Battery casing: No damage<br>Battery pack: Unusable |
| Example 10-4 | OK | Battery casing: No damage<br>Battery pack: Unusable |
| Example 10-5 | OK | Battery casing: No damage<br>Battery pack: Unusable |
| Example 10-6 | OK | Battery casing: No damage<br>Battery pack: Unusable |
| Example 10-7 | OK | Battery casing: No damage<br>Battery pack: Unusable |
| Example 10-8 | OK | Battery casing: No damage<br>Battery pack: Unusable |
| Example 10-9 | OK | Battery casing: No damage<br>Battery pack: Unusable |
| Example 10-10 | OK | Battery casing: No damage<br>Battery pack: Unusable |
| Example 10-11 | OK | Battery casing: No damage<br>Battery pack: Unusable |
| Example 10-12 | OK | Battery casing: No damage<br>Battery pack: Unusable |
| Example 11-1 | OK | Battery casing: No damage<br>Battery pack: Unusable |
| Example 11-2 | OK | Battery casing: No damage<br>Battery pack: Unusable |
| Example 11-3 | OK | Battery casing: No damage<br>Battery pack: Unusable |
| Example 11-4 | OK | Battery casing: No damage<br>Battery pack: Unusable |
| Example 11-5 | OK | Battery casing: No damage<br>Battery pack: Unusable |

TABLE 7

| | Usable or not without damage after 1.5 m drop test | Damage of battery casing and pack after 10 m drop test |
|---|---|---|
| Example 12-1 | OK | Battery casing: No damage<br>Battery pack: Unusable |
| Example 12-2 | OK | Battery casing: No damage<br>Battery pack: Unusable |
| Example 12-3 | OK | Battery casing: No damage<br>Battery pack: Unusable |
| Example 12-4 | OK | Battery casing: No damage<br>Battery pack: Unusable |
| Example 12-5 | OK | Battery casing: No damage<br>Battery pack: Unusable |
| Example 12-6 | OK | Battery casing: No damage<br>Battery pack: Unusable |
| Example 12-7 | OK | Battery casing: No damage<br>Battery pack: Unusable |
| Example 13-1 | OK | Battery casing: No damage<br>Battery pack: Unusable |
| Example 13-2 | OK | Battery casing: No damage<br>Battery pack: Unusable |
| Example 13-3 | OK | Battery casing: No damage<br>Battery pack: Unusable |
| Example 13-4 | OK | Battery casing: No damage<br>Battery pack: Unusable |
| Example 13-5 | OK | Battery casing: No damage<br>Battery pack: Unusable |
| Example 13-6 | OK | Battery casing: No damage<br>Battery pack: Unusable |
| Example 13-7 | OK | Battery casing: No damage<br>Battery pack: Unusable |
| Example 14 | OK | Battery casing: No damage<br>Battery pack: Unusable |
| Example 15 | OK | Battery casing: No damage<br>Battery pack: Unusable |
| Example 16-1 | OK | Battery casing: No damage<br>Battery pack: Unusable |
| Example 16-2 | OK | Battery casing: No damage<br>Battery pack: Unusable |

TABLE 7-continued

| | Usable or not without damage after 1.5 m drop test | Damage of battery casing and pack after 10 m drop test |
|---|---|---|
| Example 16-3 | OK | Battery casing: No damage<br>Battery pack: Unusable |
| Example 16-4 | OK | Battery casing: No damage<br>Battery pack: Unusable |
| Example 16-5 | OK | Battery casing: No damage<br>Battery pack: Unusable |
| Example 16-6 | OK | Battery casing: No damage<br>Battery pack: Unusable |
| Example 16-7 | OK | Battery casing: No damage<br>Battery pack: Unusable |
| Example 16-8 | OK | Battery casing: No damage<br>Battery pack: Unusable |
| Example 16-9 | OK | Battery casing: No damage<br>Battery pack: Unusable |
| Example 16-10 | OK | Battery casing: No damage<br>Battery pack: Unusable |
| Example 16-11 | OK | Battery casing: No damage<br>Battery pack: Unusable |
| Example 16-12 | OK | Battery casing: No damage<br>Battery pack: Unusable |
| Example 17-1 | OK | Battery casing: No damage<br>Battery pack: Unusable |
| Example 17-2 | OK | Battery casing: No damage<br>Battery pack: Unusable |
| Example 17-3 | OK | Battery casing: No damage<br>Battery pack: Unusable |
| Example 17-4 | OK | Battery casing: No damage<br>Battery pack: Unusable |
| Example 17-5 | OK | Battery casing: No damage<br>Battery pack: Unusable |

TABLE 8

| | Usable or not without damage after 1.5 m drop test | Damage of battery casing and pack after 10 m drop test |
|---|---|---|
| Example 18-1 | OK | Battery casing: No damage<br>Battery pack: Unusable |
| Example 18-2 | OK | Battery casing: No damage<br>Battery pack: Unusable |
| Example 18-3 | OK | Battery casing: No damage<br>Battery pack: Unusable |
| Example 18-4 | OK | Battery casing: No damage<br>Battery pack: Unusable |
| Example 18-5 | OK | Battery casing: No damage<br>Battery pack: Unusable |
| Example 18-6 | OK | Battery casing: No damage<br>Battery pack: Unusable |
| Example 18-7 | OK | Battery casing: No damage<br>Battery pack: Unusable |
| Example 19-1 | OK | Battery casing: No damage<br>Battery pack: Unusable |
| Example 19-2 | OK | Battery casing: No damage<br>Battery pack: Unusable |
| Example 19-3 | OK | Battery casing: No damage<br>Battery pack: Unusable |
| Example 19-4 | OK | Battery casing: No damage<br>Battery pack: Unusable |
| Example 19-5 | OK | Battery casing: No damage<br>Battery pack: Unusable |
| Example 19-6 | OK | Battery casing: No damage<br>Battery pack: Unusable |
| Example 19-7 | OK | Battery casing: No damage<br>Battery pack: Unusable |
| Example 20 | OK | Battery casing: No damage<br>Battery pack: Unusable |
| Example 21 | OK | Battery casing: No damage<br>Battery pack: Unusable |
| Example 22-1 | OK | Battery casing: No damage<br>Battery pack: Unusable |

TABLE 8-continued

| | Usable or not without damage after 1.5 m drop test | Damage of battery casing and pack after 10 m drop test |
|---|---|---|
| Example 22-2 | OK | Battery casing: No damage<br>Battery pack: Unusable |
| Example 22-3 | OK | Battery casing: No damage<br>Battery pack: Unusable |
| Example 22-4 | OK | Battery casing: No damage<br>Battery pack: Unusable |
| Example 22-5 | OK | Battery casing: No damage<br>Battery pack: Unusable |
| Example 22-6 | OK | Battery casing: No damage<br>Battery pack: Unusable |
| Example 22-7 | OK | Battery casing: No damage<br>Battery pack: Unusable |
| Example 22-8 | OK | Battery casing: No damage<br>Battery pack: Unusable |
| Example 22-9 | OK | Battery casing: No damage<br>Battery pack: Unusable |
| Example 22-10 | OK | Battery casing: No damage<br>Battery pack: Unusable |
| Example 22-11 | OK | Battery casing: No damage<br>Battery pack: Unusable |
| Example 22-12 | OK | Battery casing: No damage<br>Battery pack: Unusable |
| Example 23-1 | OK | Battery casing: No damage<br>Battery pack: Unusable |
| Example 23-2 | OK | Battery casing: No damage<br>Battery pack: Unusable |
| Example 23-3 | OK | Battery casing: No damage<br>Battery pack: Unusable |
| Example 23-4 | OK | Battery casing: No damage<br>Battery pack: Unusable |
| Example 23-5 | OK | Battery casing: No damage<br>Battery pack: Unusable |

Brief descriptions of the structures and properties of the battery packs in the Examples and Comparative Examples shown in Tables 1 to 4 are made below.

In the group of Examples 1, different materials are individually used in the outer covering layer of the rigid covering member. In the group of Examples 2, the material for the metal layer of the rigid covering member in Example 1-1 is changed to different materials. In Example 3, the thickness of the outer covering layer of the rigid covering member in Example 1-6 is increased. In Example 4, the material for the metal layer of the rigid covering member in Example 3 is changed to stainless steel and the thickness thereof is increased. In the group of Examples 5, the material for the bonding layer of the rigid covering member in Example 1-1 is changed to different materials. In the group of Examples 6, the material for the outer covering layer of the flexible covering member in Example 1-1 is changed to different materials (see Table 1).

By contrast, in Comparative Example 1, the adhesive strength is lower than atmospheric pressure. A small impact/shock made the battery pack impossible to be fitted into an electric device (see Table 5).

In Comparative Example 2, the peel strength is higher than a breaking strength of the flexible covering member. After the 10 m drop test, the battery pack was able to be fitted into an electric device, but the flexible covering member was stretched and damaged, and the battery pack expanded in the electric device a few days later (see Table 5).

In Comparative Example 3, the battery is fixed to a conventional molded case with an adhesive double-faced tape, and the peel strength is higher than a breaking strength of the flexible covering member. After the 10 meters drop test, the battery pack was able to be fitted into an electric device, but the flexible covering member was stretched and damaged, and the battery pack expanded in the electric device a few days later (see Table 5).

In Comparative Example 4, the battery element is sealed without conducting deaeration in the flexible covering member. The adhesion between the battery element and the flexible covering member was unsatisfactory, and the battery element was unsatisfactorily unified with the flexible covering member. In 1.5 meters drop test, the battery pack was deformed due to lack of strength, and was unable to be fitted into an electric device. Further, in the 10 m drop test, both the battery element and the casing material were damaged, causing heat generation or gas generation (see Table 5).

In the group of Examples 7, different materials are individually used in the outer covering layer of the rigid covering member to form a composite layer. In the group of Examples 8, the metal layer of the rigid covering member and the metal layer of the flexible covering member in Example 7-1 are individually changed to different materials of the same type each having a predetermined thickness. In the group of Examples 9, the thickness of the metal layer of the rigid covering member in Example 7-1 is changed to 300 µm so that the total thickness of the metal layers is 335 µm. In the group of Examples 10, the materials for the composite layer and adhesive tape in Example 7-1 are changed to different materials. In the group of Example 11, the material for the outer covering layer of the flexible covering member in Example 7-1 is changed to different materials (see Table 2).

In Table 3, in the group of Examples 12, different materials are individually used in the outer covering layer of the rigid covering member. In the group of Examples 13, the material for the metal layer of the rigid covering member in Example 12-1 is changed to different materials. In Example 14, the thickness of the outer covering layer of the rigid covering member in Example 12-6 is increased. In Example 15, the thickness of the metal layer of the rigid covering member in Example 14 is increased. In the group of Examples 16, the material for the adhesive tape in Example 12-1 is changed to different materials. In the group of Examples 17, the material for the outer covering layer of the flexible covering member in Example 12-1 is changed to different materials.

In Table 4, in the group of Examples 18, different materials are individually used in the outer covering layer of the rigid covering member. In the group of Examples 19, the material for the metal layer of the rigid covering member in Example 18-1 is changed to different materials. In Example 20, the thickness of the outer covering layer of the rigid covering member in Example 18-6 is increased. In Example 21, the thickness of the metal layer of the rigid covering member in Example 20 is increased. In the group of Examples 22, the material for the bonding layer of the rigid covering member in Example 18-1 is changed to different materials. In the group of Examples 23, the material for the outer covering layer of the flexible covering member in Example 18-1 is changed to different materials.

As can be seen from Tables 5 to 8, with respect to each of the battery packs in the Examples, after the 1.5 meters drop test, all the battery, battery casing, and battery pack can be used without any problems.

Further, with respect to each of the battery packs in the Examples, after the 10 meters drop test, the casing for battery pack was deformed and unable to be used, but the battery body and casing were not damaged and a phenomenon of gas generation or the like did not occur.

According to embodiment, by appropriately controlling the state of bonding between the flexible covering member and the rigid covering member so that the adhesive strength and peel strength are in the respective predetermined ranges, there can be provided a battery pack which is advantageous not only in that the load concentration on the flexible covering member is reduced and hence the battery pack is improved in reliability or safety after suffering drop and has such strength that the battery pack can resist deformation or the like when it suffers an impact/shock of short drop and, when the battery pack suffers an impact/shock such that the flexible covering member is damaged, the appearance of the resultant battery pack advantageously reveals that the battery pack cannot be subsequently fitted into an electronic device or charged, but also in that the battery pack has such excellent volume efficiency that the volume of the battery element to be contained can be as large as possible.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A battery pack comprising:
a non-aqueous electrolyte secondary battery including:
a battery element including a positive electrode, a negative electrode, and a separator which are spirally wound or stacked, the separator being disposed between the positive electrode and the negative electrode, the battery element including a non-aqueous electrolyte composition,
a tape; and
a flexible covering member, formed of a first laminated film, which covers the battery element, the first laminated film being composed of a first heat-bonding layer, a first metal layer, and a first outer covering layer which are laminated successively, said first outer covering layer including a first portion that covers the battery element and a second portion folded over said first portion;
wherein the flexible covering member is sealed around the battery element while leaving electrode terminals of the positive and negative electrodes extended outside the battery element, said tape being disposed between said first portion and said second portion of said first outer covering layer;
a rigid covering member which covers the non-aqueous electrolyte secondary battery together with the flexible covering member, the rigid covering member being formed of a second laminated film composed of a second heat-bonding layer, a second metal layer, and a second outer covering layer which are laminated successively; and
a protection circuit board, housed in the rigid covering member, for controlling a voltage and a current of the non-aqueous electrolyte secondary battery,
wherein the battery element and the flexible covering member adhere to each other, and
the flexible covering member and the rigid covering member are bonded with an adhesive strength equal to or higher than atmospheric pressure and with a peel strength equal to or lower than a breaking strength of the flexible covering member, wherein the flexible covering member and the rigid covering member are bonded such that the first outer covering layer is not melted and the second heat-bonding layer is melted.

2. The battery pack according to claim 1, wherein the adhesive strength is 0.1 MPa or more and the peel strength is 5.0 N/mm or less.

3. The battery pack according to claim 1, wherein:
the rigid covering member and the flexible covering member are thermally fused, and
the second heat-bonding layer is composed of at least one resin selected from the group consisting of an ethylene-vinyl acetate copolymer, an ethylene-acrylic acid copolymer, an ethyl acrylate copolymer, a methyl acrylate copolymer, a methacrylic acid copolymer, a methyl methacrylate copolymer, polyacrylonitrile, an ethylene-vinyl alcohol resin, a polyamide resin, a polyester resin, and acid-modified polypropylene.

4. The battery pack according to claim 1, wherein the first heat-bonding layer is composed of cast polypropylene and/or cast polyethylene.

5. The battery pack according to claim 1, wherein the first outer covering layer has a thermal conductivity of 1 or less and a melting temperature higher than that of the second heat-bonding layer.

6. The battery pack according to claim 1, wherein the first outer covering layer is composed of a material which is different from that of the second heat-bonding layer, and which includes solely or a combination of at least one oriented resin material selected from the group consisting of polyolefin, polyamide, polyimide, and polyester.

7. The battery pack according to claim 1, wherein a laminated layer of the second outer covering layer and the second metal layer has a thermal conductivity of $1,000\ Wm^{-2}K^{-1}$ or more.

8. The battery pack according to claim 1, wherein the rigid covering member is formed of a combination of the second metal layer having a thermal conductivity of $50,000\ Wm^{-2}K^{-1}$ or more and the second outer covering layer having a thermal conductivity of $1,050\ Wm^{-2}K^{-1}$ or more.

9. The battery pack according to claim 1, wherein the second metal layer is composed of at least one metal selected from the group consisting of aluminum, copper, iron, stainless steel, and nickel or iron plated with at least one metal selected from the group consisting of tin, zinc, and nickel, and has a thickness of 330 μm or less.

10. The battery pack according to claim 1, wherein the second outer covering layer is composed of polyamide, polyester, or polyolefin and has a thickness of 115 μm or less.

11. The battery pack according to claim 10, wherein the polyamide is oriented nylon 6, the polyester is at least one resin selected from the group consisting of polybutylene terephthalate, polyethylene terephthalate, and polyethylene naphthalate, and the polyolefin is oriented polypropylene or oriented polyethylene.

12. The battery pack according to claim 1, wherein said tape is selected from the group consisting of resin tape and adhesive double-faced tape.

13. A battery pack comprising:
a non-aqueous electrolyte secondary battery including:
a battery element including a positive electrode, a negative electrode, and a separator which are spirally wound or stacked, the separator being disposed between the positive electrode and the negative electrode, the battery element including a non-aqueous electrolyte composition,
a tape;
a flexible covering member, formed of a first laminated film, which covers a principal portion of the battery element, the first laminated film being composed of a first heat-bonding layer, a first metal layer, and a first outer covering layer which are laminated successively,
a rigid covering member, formed of a second laminated film, which covers a remaining portion of the battery element and the flexible covering member, the second laminated film being composed of a second heat-bonding layer, a second metal layer, and a second outer covering layer which are laminated successively,
wherein the flexible covering member and the rigid covering member are bonded around the battery element to seal the battery element while leaving electrode terminals of the positive and negative electrodes extended outside the battery element, said tape being disposed between the flexible covering member and the rigid covering member; and
a protection circuit board, housed in the rigid covering member, for controlling a voltage and a current of the non-aqueous electrolyte secondary battery,
wherein the battery element and the flexible covering member adhere to each other,
wherein the flexible covering member and the rigid covering member other than around the battery element are bonded with an adhesive strength equal to or higher than atmospheric pressure and with a peel strength equal to or lower than a breaking strength of the flexible covering member, wherein the flexible covering member and the rigid covering member are bonded such that the first outer covering layer is not melted and the second heat-bonding layer is melted.

14. The battery pack according to claim 13, wherein said tape is selected from the group consisting of resin tape and adhesive double-faced tape.

* * * * *